US010012312B2

(12) United States Patent
Adachi et al.

(10) Patent No.: US 10,012,312 B2
(45) Date of Patent: Jul. 3, 2018

(54) SPEED CHANGE APPARATUS FOR VEHICLE

(71) Applicant: HONDA MOTOR CO., LTD., Tokyo (JP)

(72) Inventors: Jun Adachi, Wako (JP); Junya Ono, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 305 days.

(21) Appl. No.: 15/075,304

(22) Filed: Mar. 21, 2016

(65) Prior Publication Data

US 2016/0290442 A1 Oct. 6, 2016

(30) Foreign Application Priority Data

Mar. 30, 2015 (JP) ................. 2015-070047

(51) Int. Cl.
| | | |
|---|---|---|
| *B60K 20/00* | (2006.01) | |
| *F16H 3/08* | (2006.01) | |
| *F16H 63/18* | (2006.01) | |
| *F16H 3/30* | (2006.01) | |
| *F16H 57/02* | (2012.01) | |

(52) U.S. Cl.
CPC ............ *F16H 63/18* (2013.01); *F16H 3/30* (2013.01); *F16H 2057/0203* (2013.01); *F16H 2057/02065* (2013.01); *F16H 2200/0043* (2013.01)

(58) Field of Classification Search
CPC . F16H 3/006; F16H 3/02; F16H 59/02; F16H 63/32
USPC ................ 74/325, 473.3, 473.35, 473.36
See application file for complete search history.

(56) References Cited

U.S. PATENT DOCUMENTS

| | | | | |
|---|---|---|---|---|
| 8,567,276 B2* | 10/2013 | Saitoh | .................... | B62K 11/04 |
| | | | | 74/340 |
| 9,481,372 B2* | 11/2016 | Ono | ........................ | F16H 63/46 |
| 2007/0240956 A1 | 10/2007 | Minami | | |
| 2007/0295159 A1* | 12/2007 | Nishi | ...................... | F16H 57/04 |
| | | | | 74/606 R |
| 2008/0087119 A1* | 4/2008 | Shiozaki | ................. | F16D 25/10 |
| | | | | 74/330 |
| 2009/0084210 A1 | 4/2009 | Tsukada et al. | | |

(Continued)

FOREIGN PATENT DOCUMENTS

| | | |
|---|---|---|
| JP | 08-93786 A | 4/1996 |
| WO | WO 2014/157631 A1 | 10/2014 |

OTHER PUBLICATIONS

U.S. Notice of Allowance U.S. Appl. No. 15/075,297 dated Aug. 31, 2016.

*Primary Examiner* — Ha Dinh Ho
(74) *Attorney, Agent, or Firm* — Squire Patton Boggs (US) LLP

(57) ABSTRACT

A speed change apparatus includes a transmission, a change mechanism configured to move a gear or gears so as to change gear position, a force accumulation mechanism which includes a shift spindle and a force accumulation spring. The shift spindle is provided, in a rotatable manner, with a master arm configured to operate the change mechanism. A return spring is configured to bias the master arm toward a neutral position. A sub return spring, separate from the return spring and which directly biases the shift spindle toward the neutral position, is provided between the shift spindle and a case member.

6 Claims, 22 Drawing Sheets

(56) References Cited

U.S. PATENT DOCUMENTS

2011/0190990 A1 8/2011 Nedachi et al.
2012/0298466 A1 11/2012 Nedachi et al.

* cited by examiner

SPEED CHANGE APPARATUS FOR VEHICLE

BACKGROUND

Field

The present invention relates to a speed change apparatus for a vehicle.

Description of the Related Art

Conventionally, in relation to a transmission for a motorcycle provided with an AMT (automated manual transmission) transmission, there has been disclosed a peripheral structure for a shift spindle (see, for example, PCT Patent Publication No. WO 2014/157631 (Patent Document 1)). Specifically, the shift spindle in the document is of a so-called interlocked spindle type provided with both a clutch lever for operating a clutch and a master arm for operating a change mechanism of the transmission. Besides, a force accumulation mechanism is provided between the shift spindle and the master arm. Here, the shift spindle is driven by a shift motor.

The change mechanism includes the master arm, a shift drum rotated by the master arm, and a shift fork which is driven by the shift drum and moves in an axial direction a shifter gear constituting a part of a row of gears in the transmission. A stopper pin is provided at a wall portion of a power unit case, and a return spring for biasing the master arm so as to return into a neutral position is provided in a locked manner between the master arm and the stopper pin.

The force accumulation mechanism includes a gear shift arm which is provided on the shift spindle in a relatively rotatable manner and rotates the master arm, a force accumulation collar which is rotated as one body with the shift spindle, and a force accumulation spring which is provided between the gear shift arm and the force accumulation collar.

In the motorcycle provided with such a force accumulation mechanism, when a shift signal is outputted from a controller of the AMT during running of the vehicle and the shift spindle is rotated, the gear shift arm receives a load in a direction in which it is rotated through the force accumulation spring from the force accumulation collar. However, until the clutch lever is rotated and the clutch is disengaged, a frictional force due to a driving force for running is acting on dog clutch tooth side surfaces (driving force transmitting surfaces) between a shifter gear and a free gear in the row of gears in the transmission. Therefore, the shift fork cannot move the shifter gear. For this reason, before the clutch is disengaged, the gear shift arm does not rotate the master arm and the shift drum, even if the shift spindle is rotated; thus, only the force accumulation collar and the force accumulation spring are rotated, whereby load is gradually accumulated in the force accumulation spring. Thereafter, when the clutch lever disengages the clutch, the frictional force acting on the dog tooth side surfaces in the row of gears in the transmission is released, so that the gear shift arm, the master arm and the shift drum are quickly rotated at a stroke by the load and rotational angle having been accumulated in the force accumulation spring. As a result, the time required for a gear change can be shortened.

A problem to be solved relates to a return torque of a shift spindle and a torque which is applied to a shift drum by a master arm. First, a torque applied to a shift drum by a master arm in a related art example will be described.

The torque applied to the shift drum by the master arm is determined by torques exerted on a force accumulation mechanism, a return spring, a shift spindle, and a shift motor. Here, description will be made along a downstream course of a transmission path of a driving force in a change mechanism. For simplicity of explanation, frictions on component parts (frictions in bearing portions, etc.) are neglected. A shift motor is disposed at the most upstream end of the transmission path of the driving force in the change mechanism. As shown in FIG. 21, a torque exerted on the shift spindle after the speed of rotation of the shift motor is reduced by a speed reduction gear is referred to as $T_{MO}$. The relation of a torque $T_{SD}$, which is applied to the force accumulation spring downstream of the shift spindle by the shift spindle, with $T_{MO}$ is $T_{SD}=T_{MO}$. The relation of a torque $T_{CR}$, which is applied to the master arm downstream of the force accumulation spring by the force accumulation spring, with $T_{SD}$ is $T_{CR}=T_{SD}$. Not only the torque from the force accumulation spring but also a reverse-direction torque $T_{mr}$ from the return spring is applied to the master arm. Therefore, a torque $T_{MA}$ exerted on the shift drum downstream of the master arm by the master arm is $T_{MA}=T_{CR}-T_{mr}$. The speed at which the change mechanism is moved is higher as the torque $T_{MA}$ exerted on the shift drum by the master arm is higher.

Note that after an operation of the master arm is started (after an operation of the shift drum is started), "dog abutment" may be generated in which a top surface of a dog tooth of the shifter gear being moved comes into abutment on a top surface of a dog tooth of the free gear on the intended shift position side (for dog abutment, refer to Japanese Patent Laid-Open No. 2014-199102). Where dog abutment is generated, the dog abutment will be soon canceled by a difference in rotational speed between the shifter gear and the free gear on the intended shift position side. Although the dog abutment is soon canceled, the time taken for canceling the dog abutment during the driving force non-transmission period is prolonged, and the time taken for the dog teeth to move in the axial direction for meshing with each other (the time necessary for a reliable shift) is shortened accordingly. In some cases, "shallow engagement" may be generated in which the dog teeth are meshed in a shallow depth of mesh. While dog abutment is generated on a probability basis, in order to restrain the generation of dog abutment, it is desirable that the difference between the torque of the master arm and the torque of the return spring at the time of "gear-in" be not less than a predetermined value ($T_{ES}$), as shown in FIG. 20.

Here, in the transmission as in the related art example, it may be desired, depending on the model of the transmission, to enhance the load of the return spring. If it is attempted to simply enhance the torque $T_{mr}$ of the return spring and secure the above-mentioned predetermined value $T_{ES}$ as shown in FIG. 22 in a system according to the related art example, the increase in $T_{mr}$ makes it necessary to enhance a preload of the force accumulation spring or enlarge the thickness (diametrical size) of the force accumulation spring so as to enhance the spring constant. Then, the torque $T_{MA}'$ exerted on the shift drum by the master arm would be higher than that in the related art example of FIG. 20. An increase in $T_{MA}'$ leads to a corresponding increase in the rotational speed of the master arm as aforementioned, and the increase in the rotational speed of the master arm would lead to another problem in that the collision sound (impact sound) generated when the rotated master arm comes into contact with the stopper pin is enlarged.

SUMMARY

The present invention has been made in consideration of the problems in the related art. Accordingly, it is an object of the present invention to make it possible to enhance a return torque of a shift spindle, without enhancing torque characteristics of a force accumulation spring, and to reduce an impact sound generated when a master arm is rotated.

According to embodiments of the present invention, there is provided a speed change apparatus for a vehicle, including a transmission and a change mechanism. The transmission includes a main shaft and a counter shaft. The main shaft is driven by a crankshaft of an engine and is provided with a plurality of driving gears in a row. The counter shaft is provided with a plurality of driven gears in a row which are driven by the driving gears. The change mechanism is configured to move at least one gear of the pluralities of driving gears and driven gears so as to change gear position. The speed change apparatus also includes a force accumulation mechanism, including a shift spindle provided with a master arm configured to operate the change mechanism. The shift spindle and the master arm are rotatable relative to each other. A force accumulation collar is provided on the shift spindle and rotated as one body with the shift spindle. A gear shift arm is rotatable relative to the shift spindle, and a force accumulation spring is arranged between the force accumulation collar and the gear shift arm. The speed change apparatus further includes a return spring provided between the master arm and a stopper portion on a case member side of the transmission, the return spring configured to bias the master arm toward a neutral position. A sub return spring configured to directly bias the shift spindle toward the neutral position is provided between the shift spindle and the case member, the sub return spring being a separate body from the return spring.

In accordance with certain embodiments of the present invention, the speed change apparatus for a vehicle includes, between the shift spindle and the case member, the sub return spring which is a separate body from the return spring of the force accumulation mechanism and which directly biases the shift spindle toward the neutral position. The sub return spring provided between the shift spindle and the case member as a separate body from the return spring does not influence the torque exerted on the change mechanism from the master arm by the force accumulated in the force accumulation spring attendant on the rotation of the shift spindle. This torque, therefore, is a torque obtained by subtracting the torque of the return spring from the torque of the force accumulation spring. Accordingly, it is unnecessary to enhance the torque characteristics of the force accumulation spring in order to secure the above-mentioned predetermined value $T_{ES}$. In addition, the return torque exerted on the shift spindle is the sum of the torque of the return spring and the torque of the sub return spring. Thus, a high return torque can be secured. Consequently, it is possible to enhance the return torque of the shift spindle, without enhancing the torque characteristics of the force accumulation spring, and to reduce the impact sound generated when the master arm is rotated.

The speed change apparatus for a vehicle according to the present invention may have a configuration wherein the sub return spring is arranged between a boss which is integrally formed from a wall portion of the case member and a sub return spring locking collar which is provided on the shift spindle and rotated as one body with the shift spindle.

In accordance with certain embodiments, the sub return spring is arranged between the boss which is formed integrally from the wall portion of the case member and the sub return spring locking collar which is provided on the shift spindle and rotated as one body with the shift spindle. Therefore, the sub return spring can be provided in a simple configuration.

The speed change apparatus for a vehicle according to the present invention may have a configuration wherein the case member is provided by mating a one-side case half and an other-side case half to each other in transverse direction. A transmission chamber in which to accommodate the driving gears and the driven gears of the transmission is defined by an outer wall of the one-side case half and an inner wall near a faying portion of the other-side case half. The sub return spring is disposed inside the transmission chamber; and the sub return spring locking collar is disposed outside of the transmission chamber. The inner wall is provided with a hole arc-shaped as viewed in an axial direction, and an arm portion of the sub return spring locking collar is provided to extend through the hole.

In accordance with certain embodiments, the sub return spring is disposed inside the transmission chamber, while the sub return spring locking collar is disposed outside of the transmission chamber. The inner wall is provided with the hole arc-shaped as viewed in the axial direction, and the arm portion of the sub return spring locking collar is provided to extend through the hole. According to this configuration, the sub return spring can be locked by the arm portion of the sub return spring locking collar extended to be passed through the hole in the inner wall from outside of the transmission chamber, so that the sub return spring can be provided in the dead space of the transmission chamber. Consequently, the transmission can be made smaller in size.

In the speed change apparatus according to the present invention, a return torque of a shift spindle can be enhanced without enhancing the torque characteristics of a force accumulation spring, and the impact sound generated when a master arm is rotated can be reduced.

In addition, a sub return spring can be provided while adopting a simple configuration.

Further, the sub return spring can be provided in a dead space of a transmission chamber, so that a transmission can be made smaller in size.

DETAILED DESCRIPTION

Figure 1:
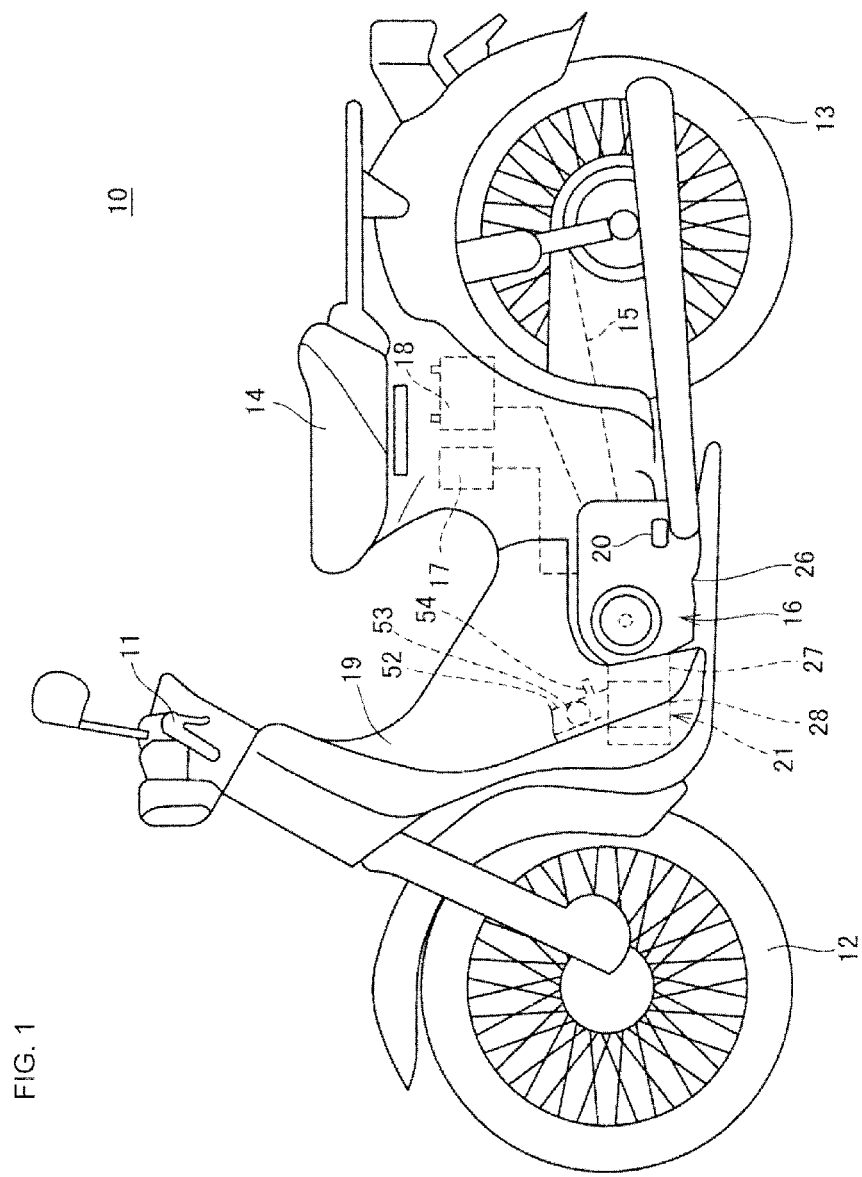
FIG. 1 is a left side view of a motorcycle provided with an automatic speed change apparatus according to an embodiment of the present invention.

FIG. 1 is a left side view of a motorcycle 10 provided with an automatic speed change apparatus 25 according to an embodiment of the present invention.

The motorcycle 10 includes a handlebar 11 rotatably supported on a head pipe (not shown), a front wheel 12 steered by the handlebar 11, a rear wheel 13 as a driving wheel, a seat 14 on which to seat a driver, a power unit 16 configured to supply a driving force to the rear wheel 13 through a chain 15, a control unit 17 (speed change controller) configured to control the power unit 16, and a battery 18.

The motorcycle 10 is configured based on a body frame (not shown), and the body frame is covered with a body cover 19. The control unit 17 and the battery 18 are disposed under the seat 14 and inside the body cover 19. The power unit 16 is provided at a roughly middle position between the front wheel 12 and the rear wheel 13, downwardly and slightly forwardly of the seat 14. A pair of left and right driver footrests 20 are provided at lower portions of the power unit 16.

The configuration of the power unit 16 will now be described.

Figure 2:
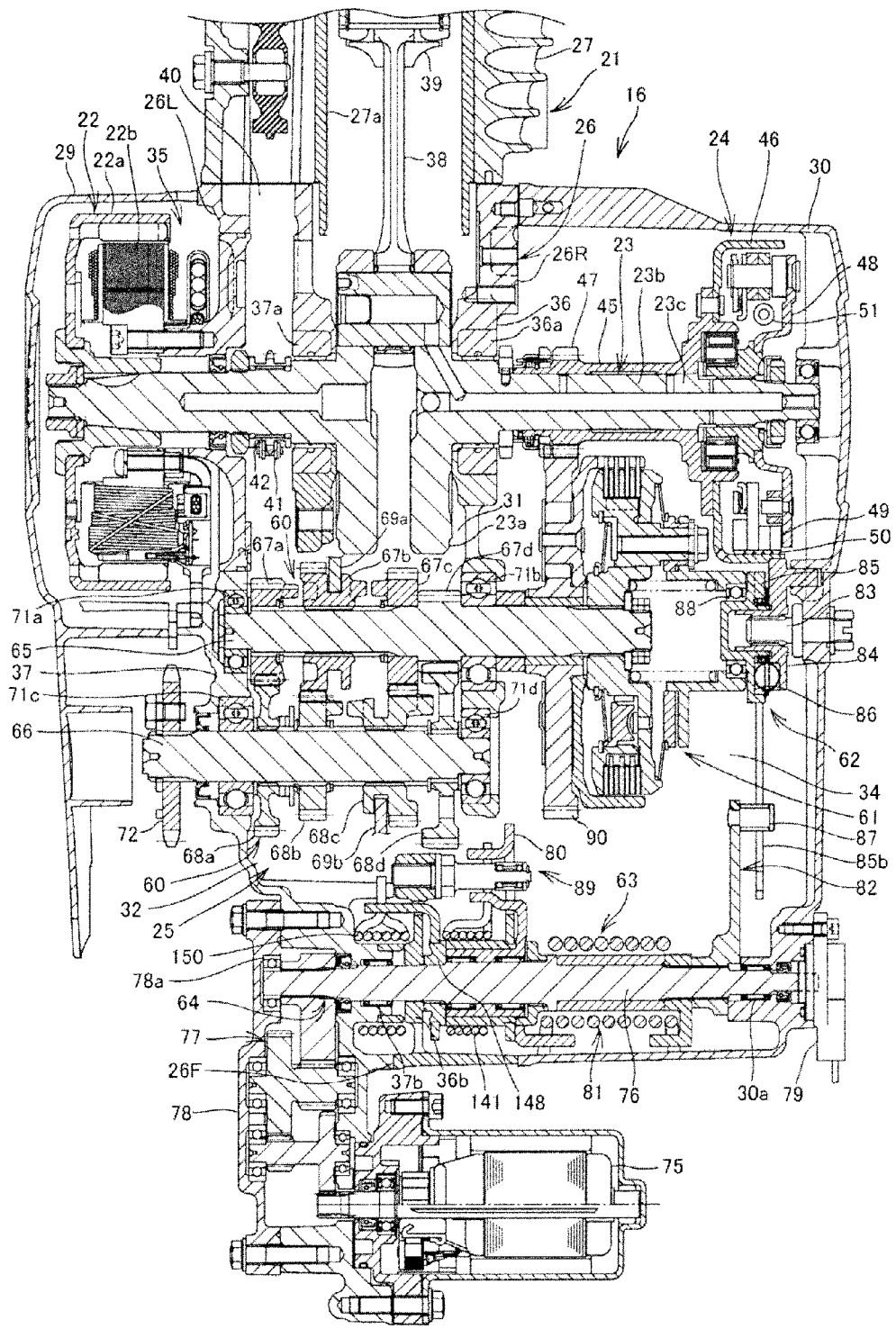
FIG. 2 is a sectional view of a power unit.

FIG. 2 is a sectional view of the power unit 16. In FIG. 2, the left-right direction on the sheet surface corresponds to the transverse direction (vehicle width direction), the upward direction on the sheet surface corresponds to the forward direction of the vehicle, and the downward direction on the sheet surface corresponds to the rearward direction of the vehicle.

The power unit 16 includes an engine 21 configured to generate a driving force for running, a generator 22, a starting clutch 24 provided on a crankshaft 23 of the engine 21, and the automatic speed change apparatus 25 (speed change apparatus) configured to output a driving force of the crankshaft 23 (which is outputted through the starting clutch 24) with speed change.

The engine 21 is configured by integrally connecting a crankcase 26 (case member), a cylinder 27, and a cylinder head 28.

As illustrated in FIG. 1, an intake pipe 52 extending from an air cleaner box (not shown) is connected to an intake port of the cylinder head 28. The intake pipe 52 is provided with an electronically controlled throttle valve 53 for regulating the quantity of air supplied to the engine 21. In the intake pipe 52, a fuel injection valve 54 is provided downstream of the throttle valve 53.

The crankcase 26 is configured to be bisected to a left portion and a right portion (in the transverse direction) at a plane orthogonal to the crankshaft 23. Specifically, the crankcase 26 has a one-side case half 26L on the left side and an other-side case half 26R on the right side. In addition, the engine 21 is provided with a generator cover 29 which covers the one-side case half 26L from the left side, and a clutch cover 30 which covers the other-side case half 26R from the right side.

The one-side case half 26L and the other-side case half 26R are mated with each other at a faying surface 26F (faying portion), and are coupled together by a plurality of coupling bolts (not shown) extending in the transverse direction.

A crank chamber 31 in which to accommodate the crankshaft 23 is provided at a front portion of the inside of the crankcase 26. In the crankcase 26, a transmission chamber 32 is provided rearwardly of the crank chamber 31. The transmission chamber 32 is partitioned by a wall portion 37 (a wall portion of the case member; outer wall) of the one-side case half 26L constituting a left side surface of the crankcase 26, and a wall portion 36 (inner wall) of the other-side case half 26R constituting a right side surface of the crankcase 26.

A clutch chamber 34 is provided on the right side of the crank chamber 31 and the transmission chamber 32. A generator chamber 35 is provided on the left side of the crank chamber 31. The clutch chamber 34 is partitioned by an outside surface of the wall portion 36 of the other-side case half 26R and an inside surface of the clutch cover 30. The generator chamber 35 is partitioned by an outside surface of the wall portion 37 of the one-side case half 26L and an inside surface of the generator cover 29.

The crankshaft 23 has a crank web 23a, and a shaft portion 23b extending toward both sides in the transverse direction from the crank web 23a. Of the crankshaft 23, the crank web 23a is disposed within the crank chamber 31, and the shaft portion 23b is rotatably borne on bearing portions 36a and 37a provided respectively at the wall portion 36 and the wall portion 37. A connecting rod 38 is connected to the crank web 23a through a crank pin. A piston 39 connected to a tip of the connecting rod 38 is reciprocated within a cylinder bore 27a of the cylinder 27.

One end of the shaft portion 23b of the crankshaft 23 extends into the generator chamber 35, and this end is fixed to a rotor 22a of the generator 22. A stator 22b of the generator 22 is fixed to the one-side case half 26L.

The wall portion 37 is provided with a cam chain chamber 40 on the inside thereof. A cam chain 41 for driving a valve mechanism (not shown) in the cylinder head 28 extends through the cam chain chamber 40 and is wrapped around a driving sprocket 42 on the shaft portion 23b.

An other end 23c of the shaft portion 23b of the crankshaft 23 extends into the clutch chamber 34. The starting clutch 24 of a centrifugal type is provided at a tip portion of the other end 23c.

The starting clutch 24 serves for engagement and disengagement between the crankshaft 23 and the automatic speed change apparatus 25 at the time of starting of the vehicle and at the time of stopping of the vehicle.

The starting clutch 24 includes a cup-shaped outer case 46 fixed to one end of a sleeve 45 rotatable relative to the outer circumference of the crankshaft 23, and a primary gear 47 provided at the outer circumference of the sleeve 45. An outer plate 48 is fixed to a right end portion of the crankshaft 23, and a shoe 50 is attached to an outer circumferential portion of the outer plate 48 through a weight 49 so as to be directed radially outward. A spring 51 is provided for biasing the shoe 50 radially inward. The starting clutch 24 is so configured that when the rotational speed of the engine is not more than a predetermined value, the outer case 46 and the shoe 50 are separate from each other, and the crankshaft 23 and the automatic speed change apparatus 25 are in a disengaged state from each other (in a separated state where power is not transmitted therebetween). When the engine rotational speed rises to exceed a predetermined value, a centrifugal force causes the weight 49 to move radially outward against the spring 51, which brings the shoe 50 into contact with an inner circumferential surface of the outer case 46. This causes the sleeve 45 to be fixed onto the crankshaft 23 together with the outer case 46, resulting in that the rotation of the crankshaft 23 is transmitted to the automatic speed change apparatus 25 through the primary gear 47.

In the automatic speed change apparatus 25, switching-over of a change clutch 61 which will be described later and switching-over of gear position (shift) are performed automatically.

The automatic speed change apparatus 25 includes a forward four-speed transmission 60; the change clutch 61 is configured to switch over the connection between the crankshaft 23 side and the transmission 60. A clutch operation mechanism 62 is configured to operate the change clutch 61. A gear change mechanism 63 is configured to change gear in the transmission 60, and an actuator mechanism 64 configured to drive the clutch operation mechanism 62 and the gear change mechanism 63. The actuator mechanism 64 is controlled by the control unit 17 (FIG. 1).

The automatic speed change apparatus 25 is connected to a mode switch 132b (FIG. 9) for switching between an automatic transmission (AT) mode and a manual transmission (MT) mode, and to a shift selection switch 132a (FIG. 9) operated by the driver to select either a shift-up or a shift-down. The automatic speed change apparatus 25 is so configured that under a control of the control unit 17, the actuator mechanism 64 can be controlled according to output signals from sensors as well as the mode switch 132b and the shift selection switch 132a, thereby the gear position in the transmission 60 can be changed automatically or semi-automatically.

Specifically, in the automatic transmission mode, the actuator mechanism 64 is controlled on the basis of vehicle speed and the like, and a gear change (shift) in the transmission 60 is performed automatically. In the manual transmission mode, the driver operates the shift selection switch 132a to make a gear shift.

The transmission 60 transmits rotation, supplied from the change clutch 61, to the rear wheel 13 with a speed change based on a command from the control unit 17. The transmission 60 includes a main shaft 65 as an input shaft, and a counter shaft 66 disposed in parallel to the main shaft 65. Driving gears 67a, 67b, 67c and 67d (a row of driving gears) are provided on the main shaft 65; and driven gears 68a, 68b, 68c and 68d (a row of driven gears) provided on the counter shaft 66.

The driving gears 67a, 67b, 67c and 67d are in mesh with the driven gears 68a, 68b, 68c and 68d in this order. The driving gear 67b has dog teeth on a side surface thereof to be engaged with the adjacent driving gear 67a or 67c when the driving gear 67b is slid to the left or the right. The driven gear 68c has dog teeth on a side surface thereof to be engaged with the adjacent driven gear 68b or 68d when the driven gear 68c is slid to the left or the right.

The driving gears 67a and 67c and the driven gears 68b and 68d are free gears which are relatively rotatably retained on the main shaft 65 and the counter shaft 66, respectively. The driving gear 67b and the driven gear 68c are shifter gears which are spline-coupled to, and axially slidable relative to, the main shaft 65 and the counter shaft 66, respectively. The driving gear 67d and the driven gear 68a are fixed gears which are fixed to the main shaft 65 and the counter shaft 66, respectively.

The main shaft 65 is rotatably supported by bearings 71a and 71b, and the counter shaft 66 is rotatably supported by bearings 71c and 71d.

A sprocket 72 is provided at an end portion of the counter shaft 66. The sprocket 72 transmits rotation to the rear wheel 13 through the chain 15. In addition, a vehicle speed sensor 73 (FIG. 9) configured to detect rotational speed of the counter shaft 66 in a non-contact manner is provided in the vicinity of the counter shaft 66. The control unit 17 calculates the vehicle speed from a value detected by the vehicle speed sensor 73.

Figure 3:
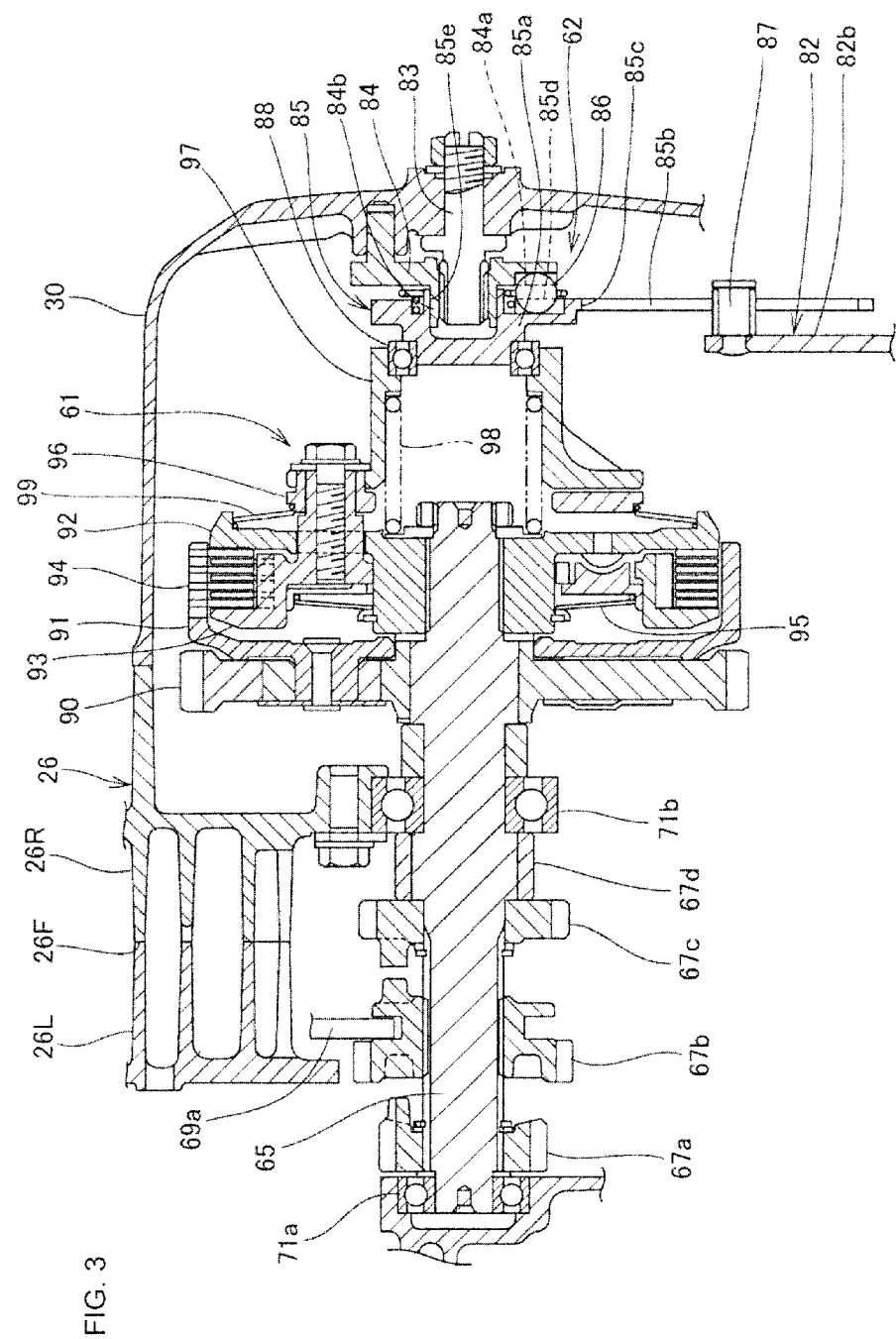
FIG. 3 is a sectional view showing a gear change mechanism, an actuator mechanism, a change clutch and a clutch operation mechanism.

FIG. 3 is a sectional view showing the gear change mechanism 63, the actuator mechanism 64, the change clutch 61 and the clutch operation mechanism 62.

Referring to FIGS. 2 and 3, the actuator mechanism 64 includes a shift motor 75 as an actuator, and a shift spindle 76 extending in the transverse direction within the crankcase 26. A speed reduction gear train 77 is configured to transmit the rotation of the shift motor 75 with speed reduction to drive the shift spindle 76. One end in the axial direction of the speed reduction gear train 77 is supported on an outside surface of the wall portion 37 of the one-side case half 26L, and the other end is supported by a cover 78 covering the wall portion 37 from an outer side.

The shift spindle 76 is provided to extend through the inside of the clutch chamber 34. The shift spindle 76 is rotatably supported at its both ends by bearings 78a and 30a provided at the cover 78 and the clutch cover 30, respectively. In addition, the shift spindle 76 is rotatably supported at its intermediate portion by a bearing 37b provided at the wall portion 37 of the one-side case half 26L. A spindle angle sensor 79 configured to detect rotational position of the shift spindle 76 is provided on the clutch cover 30.

The gear change mechanism 63 includes a change mechanism 89 configured to slide the driving gear 67b and the driven gear 68c to thereby change a shift position. A force accumulation mechanism 81 by which a force is accumulated in a force accumulation spring 145 (FIG. 10) (described later) by rotation of the shift spindle 76 and is thereafter released to rotate the change mechanism 89 at a stroke. The shift spindle 76 is shared by the force accumulation mechanism 81 and the clutch operation mechanism 62.

The change mechanism 89 includes a master arm 80 supported by the shift spindle 76 and rotated by the force accumulation mechanism 81. A shift drum 70 (FIG. 13) is rotated interlockedly with rotation of the master arm 80, and shift forks 69a and 69b configured to connect the shift drum 70 to the driving gear 67b and the driven gear 68c which are shifter gears. A support shaft (not shown) is configured to hold the shift forks 69a and 69b in an axially slidable manner.

The shift drum 70 is provided in its outer circumferential portion with grooves 70a (FIG. 13) shaped according to shift patterns. One-side ends of the shift forks 69a and 69b are connected to the grooves 70a.

When the shift drum 70 is driven by the actuator mechanism 64 to rotate, the shift forks 69a and 69b are moved in the axial direction along the grooves 70a of the shift drum 70, whereby the driving gear 67b and the driven gear 68c are slid according to a shift position.

In the transmission 60, according to sliding of the driving gear 67b and the driven gear 68c, either a neutral condition or a condition of power transmission through selective use of any one of first-speed to fourth-speed transmission gear pairs can be established between the main shaft 65 and the counter shaft 66.

The clutch operation mechanism 62 includes a clutch lever 82 fixed onto the shift spindle 76, and a support shaft 83 fixed to an inside surface of the clutch cover 30 in a positional relation such as to be substantially coaxial with the main shaft 65. A plate-shaped base member 84 is fixed to the support shaft 83, and a lifter cam plate 85 as an operating member which is connected to the clutch lever 82 and is opposed to the base member 84. A plurality of balls 86 are retained between the lifter cam plate 85 and the base member 84.

The clutch lever 82 includes a cylindrical portion 82a provided on the shift spindle 76 adjacent to the force accumulation mechanism 81. A lever portion 82b extends radially outward from the cylindrical portion 82a. The clutch lever 82 is rotated as one body with the shift spindle 76.

The lifter cam plate 85 includes a pressing operation portion 85a facing the base member 84, and a connection arm portion 85b extending from the pressing operation portion 85a and connected to the lever portion 82b of the clutch lever 82. A cam hole 85c is formed in the connection arm portion 85b. The lifter cam plate 85 is connected to the clutch lever 82 by a structure in which a pin 87 provided at the tip of the lever portion 82b of the clutch lever 82 is inserted in the cam hole 85c.

Opposed surfaces of the pressing operation portion 85a and the base member 84 are formed with slant surface-shaped cam portions 85d and 84a, respectively. The balls 86 are retained between the cam portions 85d and 84a. The lifter cam plate 85 is guided in regard of its axial movement by a structure in which a guide shaft 84b of the base member 84 is fitted in a guide hole 85e formed in the center of the lifter cam plate 85. Besides, a ball bearing 88 is provided at a tip portion of the pressing operation portion 85a. The lifter cam plate 85 is connected to the change clutch 61 through the ball bearing 88.

When the clutch lever 82 is rotated, the lifter cam plate 85 is rotated about the guide shaft 84b through the pin 87, and is moved in the axial direction through sliding of the cam portion 85d relative to the balls 86. The change clutch 61 is engaged and disengaged interlockedly with the axial movement of the lifter cam plate 85. The lifter cam plate 85 is moved in a clutch-disengaging direction irrespectively of whether the rotation of the shift spindle 76 from a normal position is in a shift-up direction or in a shift-down direction.

Figure 4:
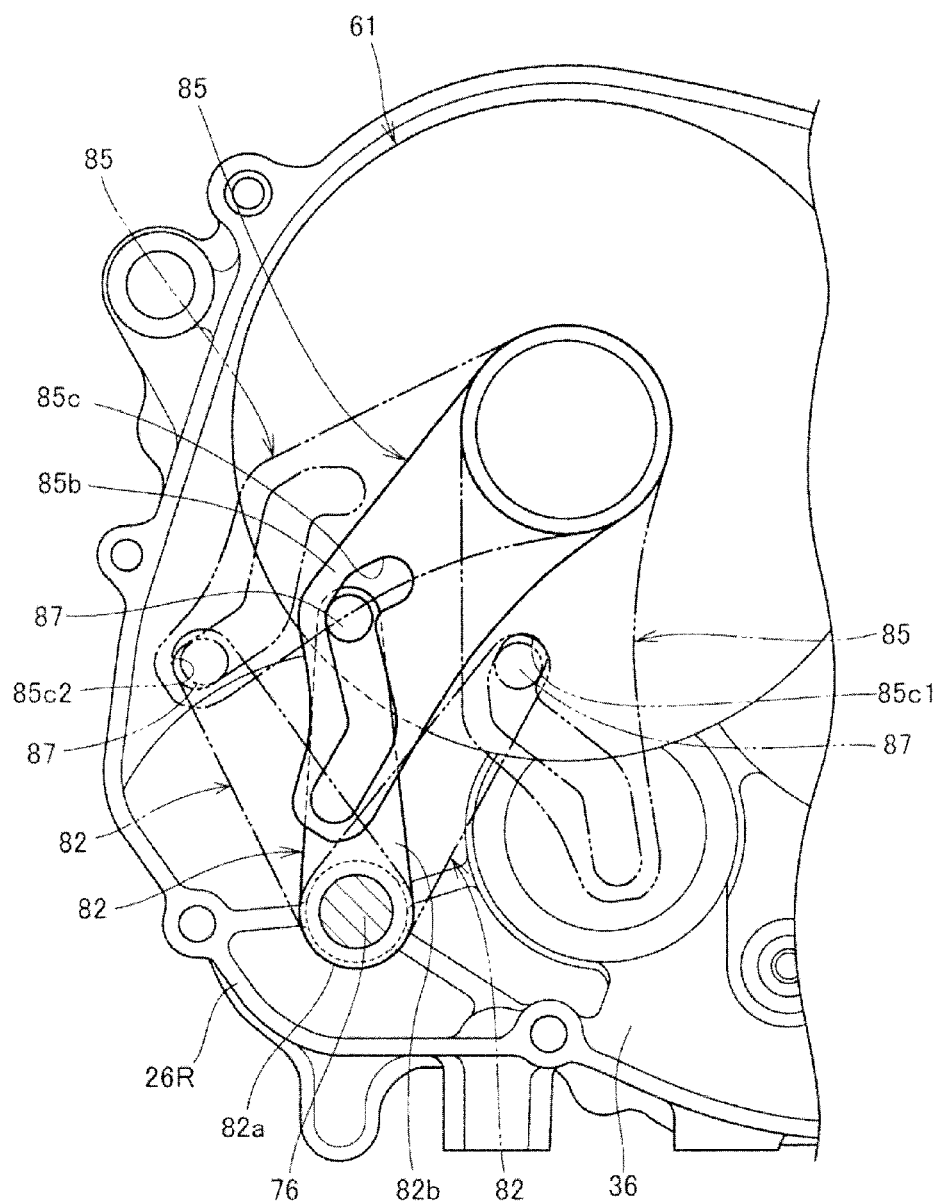
FIG. 4 is a side view showing an operating condition of a clutch lever and a lifter cam plate.

FIG. 4 is a side view showing an operating condition of the clutch lever 82 and the lifter cam plate 85.

The cam hole 85c of the lifter cam plate 85 is formed in a shape of being bent along a longitudinal direction of the connection arm portion 85b. As the shift spindle 76 rotates, the pin 87 of the clutch lever 82 moves within the cam hole 85c, whereby the lifter cam plate 85 is rotated. In other words, the axial moving amount of the lifter cam plate 85 per unit rotational amount can be set by the shape of the cam hole 85c, whereby engagement/disengagement characteristics of the change clutch 61 can be adjusted.

The shift spindle 76 is in a neutral position at normal times when neither a shift-up operation nor a shift-down operation is being conducted. In the neutral position, the clutch lever 82 extends upward substantially vertically from the shift spindle 76, and the pin 87 is located at an intermediate portion of the cam hole 85c.

In the case of shifting-up, the shift spindle is rotated clockwise in FIG. 4 (in a shift-up direction) from the neutral position, and the pin 87 is located at an inner end portion 85c1 of the cam hole 85c.

In the case of shifting-down, the shift spindle 76 is rotated counterclockwise in FIG. 4 (in a shift-down direction) from the neutral position, and the pin 87 is located at an outer end portion 85c2 of the cam hole 85c.

In the case of shifting-up, the control unit 17 rotates the shift motor 75 so as to rotate the shift spindle 76 in a shift-up direction. Attendant on the rotation of the shift spindle 76, force accumulation in the force accumulation mechanism 81 is started. When the shift spindle 76 is rotated a predetermined amount, the change clutch 61 is disengaged by rotation of the clutch lever 82. Attendant on the disengagement of the change clutch 61, the accumulated force is released, and the master arm 80 is turned to rotate the shift drum 70, whereby the gear position is shifted up by one position.

On the other hand, in the case of shifting-down, the control unit 17 rotates the shift motor 75 so as to rotate the shift spindle 76 in a shift-down direction. At the time of shifting-down, force accumulation by the force accumulation mechanism 81 is not performed. At the time of shifting-down, attendant on the rotation of the shift spindle 76, the clutch lever is rotated to disengage the change clutch 61. Thereafter, the master arm 80 is turned in a shift-down direction. As a result, the shift drum 70 is rotated, and the gear position is shifted down by one position.

In the cases of shifting-up and shifting-down, when completion of a shift is detected on the basis of the result of detection by the spindle angle sensor 79 or a gear position sensor 70b (FIG. 9), the shift spindle 76 is rotated reversely, whereby the master arm 80 is returned into a neutral position, and the change clutch 61 is engaged.

In the present embodiment, both the gear change mechanism 63 and the clutch operation mechanism 62 are driven by the single shift spindle 76 rotated by the single shift motor 75. Therefore, only one shift motor 75 is needed, which enables a simplified structure.

As shown in FIG. 2, a primary driven gear 90 for meshing with the primary gear 47 on the crankshaft 23 side is provided on an end of the main shaft 65 extending into the clutch chamber 34. The primary driven gear 90 is supported to be rotatable relative to the main shaft 65. The change clutch 61 is connected to the primary driven gear 90.

Figure 5:
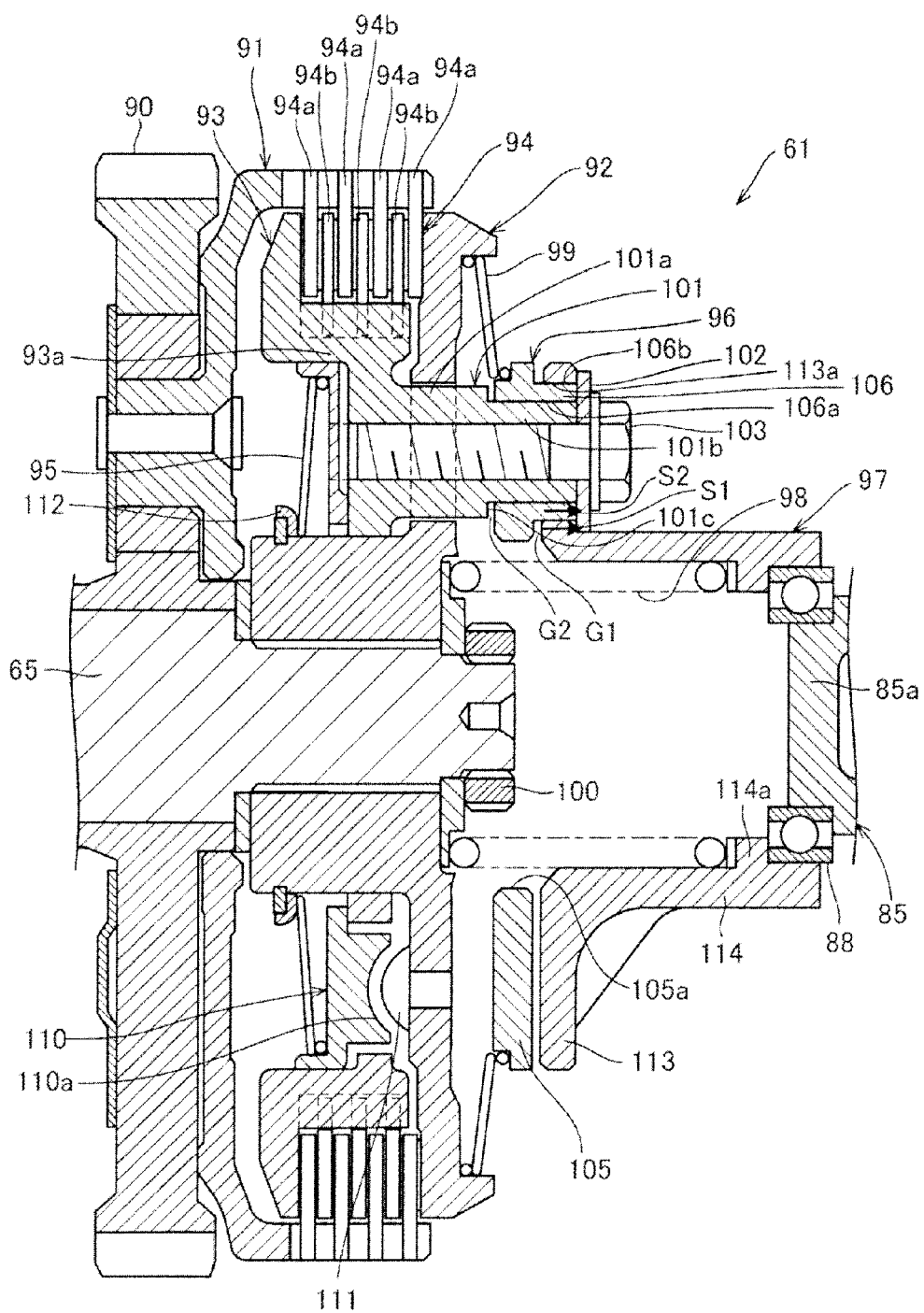
FIG. 5 is a sectional view of the change clutch.

FIG. 5 is a sectional view of the change clutch 61. Here, FIG. 5 illustrate a state in which the change clutch 61 has been completely engaged.

The change clutch 61 includes a cup-shaped clutch outer 91 fixed to the primary driven gear 90, and a disc-shaped clutch center 92 provided on a radially inner side of the clutch outer 91 and integrally fixed to the main shaft 65. A pressure plate 93 is provided on a radially inner side of the clutch outer 91 and is movable in the axial direction of the main shaft 65. Clutch discs 94 are provided between the pressure plate 93 and the clutch center 92, and a main spring 95 biases the pressure plate 93 in a clutch-engaging direction. A lifter plate 96 is disposed between the clutch center 92 and the lifter cam plate 85, and a sub lifter plate 97 is disposed between the lifter plate 96 and the lifter cam plate 85.

In addition, the change clutch 61 includes a sub spring 98 retained between the clutch center 92 and the sub lifter plate 97, a second sub spring 99 held between the clutch center 92 and the lifter plate 96, and a back torque limiting member 110.

The clutch center 92 and the pressure plate 93 are combined with each other to form an integral body, which constitutes a clutch inner disposed on the inside of the clutch outer 91.

The clutch outer 91 is integrally fixed onto an outside surface of the primary driven gear 90. The clutch outer 91 can be rotated relative to the main shaft 65, as one body with the primary driven gear 90.

The clutch center 92 is fixed by a nut 100 in the state of being spline-coupled to the main shaft 65. The clutch center 92 is non-rotatable and axially non-movable relative to the main shaft 65.

The pressure plate 93 is disposed on the inside of a cylindrical portion of the clutch outer 91, and is fitted to a shaft portion of the clutch center 92 so as to be movable in the axial direction. The pressure plate is provided with a plurality of cylindrical release bosses 101 which penetrate the clutch center 92 and are connected to the lifter plate 96.

The clutch discs 94 are clamped between the clutch center 92 and the pressure plate 93.

The clutch discs 94 include outside frictional discs 94a provided on the clutch outer 91, and inside frictional discs 94b provided on the clutch center 92. The outside frictional discs 94a and the inside frictional discs 94b are disposed in pluralities and in an alternately stacked state, between the pressure plate and the clutch center 92. Each of the outside frictional discs 94a is supported on the cylindrical portion of the clutch outer 91 through spline fitting, and is provided to be axially movable but non-rotatable relative to the clutch outer 91.

Each of the inside frictional discs 94b is supported on an outer circumferential portion of an inside cylindrical portion 93a of the pressure plate 93 through spline fitting, and is provided to be axially movable but non-rotatable relative to the pressure plate 93.

The back torque limiting member 110 is formed in a plate-like shape, and is fixed on the inside of the inside cylindrical portion 93a of the pressure plate 93 as one body with the pressure plate 93.

The back torque limiting member 110 and a lifter pin 111, which is fixed to the clutch center 92, constitute a back torque limiter mechanism. The back torque limiter mechanism is a known one as described, for example, in Japanese Patent Laid-Open No. 1996-93786. The back torque limiter mechanism is a mechanism which brings a clutch from an engaged state into a partial clutch engagement state in the case where a torque of not less than a predetermined value is exerted in a direction opposite to a forward power transmission direction.

The back torque limiting member 110 has a cam portion 110a which penetrates the pressure plate 93 to engage with the lifter pin 111. When a back torque of not less than a predetermined value acts from the rear wheel 13 side, the pressure plate 93 rotates relative to the clutch center 92, whereby the cam portion 110a is slid on the lifter pin 111, and the pressure plate 93 is moved in a clutch-disengaging direction. According to the back torque limiter mechanism, a shift shock arising from a back torque can be reduced.

The main spring 95 is retained between a retainer 112 provided on the clutch center 92 and the back torque limiting member 110. The main spring 95 biases the pressure plate 93 in a direction for clamping the clutch discs 94 between the pressure plate 93 and the clutch center 92, namely, in a clutch-engaging direction.

Each release boss 101 of the pressure plate 93 is provided at its tip portion with a guide shaft portion 101b formed to be smaller in diameter than a base end portion 101a. A stopper plate 102, larger in diameter than the guide shaft portion 101b, is fastened to a tip surface of the guide shaft portion 101b by a bolt 103. The base end portion 101a is formed at its tip surface with a stepped portion 101c opposed to the stopper plate 102.

The lifter plate 96 includes a plate-shaped ring portion 105 opposed to the clutch center 92, a spring passing hole 105a provided in the center of the ring portion 105, and lifter plate side bosses 106 projecting from the ring portion 105 toward the lifter cam plate 85 side.

A plurality of the lifter plate side bosses 106 are formed at substantially regular intervals along the circumferential direction of the lifter plate 96. Each lifter plate side boss 106 is formed in a cylindrical shape penetrating the ring portion 105. The lifter plate side boss 106 includes a hole 106a in which the guide shaft portion 101b of the release boss 101 is inserted, and an outer circumferential portion 106b to which the sub lifter plate 97 is fitted.

The lifter plate 96 is assembled with the lifter plate side bosses 106 slidably fitted in the guide shaft portions 101b of the release bosses 101. The lifter plate 96 is disposed between the stopper plate 102 and the stepped portion 101c.

The second sub spring 99 is clamped between an outside surface of the clutch center 92 and the lifter plate 96, biasing the lifter plate 96 so as to press the lifter plate 96 against the stopper plate 102 side. In a clutch engaged state, the lifter plate 96 is so disposed that a gap G2 is formed between its ring portion 105 and the stepped portion 101c, as the tip surface of the guide shaft portion 101b is put into contact with the stopper plate 102 by a biasing force of the second sub spring 99.

In other words, the second sub spring 99 is pressing the pressure plate 93 against the clutch center 92 side through the lifter plate 96 and the stopper plate 102, thereby biasing the pressure plate 93 in a clutch-engaging direction.

The sub lifter plate 97 includes a ring-shaped pressing plate portion 113 opposed to the lifter plate 96, and a cylindrical circular pipe-shaped portion 114 projecting from an inner circumferential edge at the center of the pressing plate portion 113 toward the lifter cam plate 85 side. The circular pipe-shaped portion 114 is provided substantially coaxially with the main shaft 65.

The pressing plate portion 113 is provided with holes 113a in which to fit the lifter plate side bosses 106 of the lifter plate 96. A plurality of the holes 113a are provided at positions corresponding to the respective lifter plate side bosses 106. The ball bearing 88 is fitted to a tip portion of the circular pipe-shaped portion 114.

The sub lifter plate 97 is assembled with the holes 113a slidably fitted to the lifter plate side bosses 106 of the lifter plate 96. The pressing plate portion 113 of the sub lifter plate 97 is disposed between the stopper plate 102 and the ring portion 105 of the lifter plate 96.

The sub spring 98 is retained between the clutch center 92 and a receiving portion 114a formed at the circular pipe-shaped portion 114 of the sub lifter plate 97, biasing the sub lifter plate 97 so as to press the sub lifter plate 97 against the stopper plate 102 side.

In a clutch engaged state, the sub lifter plate 97 has its pressing plate portion 113 put in contact with the stopper plate 102 by a biasing force of the sub spring 98, with a gap G1 formed between the pressing plate portion 113 and the ring portion 105.

In other words, the sub spring 98 is pressing the pressure plate 93 against the clutch center 92 side through the stopper plate 102, thereby biasing the pressure plate 93 in a clutch-engaging direction.

In a clutch engaged state as illustrated in FIG. 5, the clutch discs 94 are clamped by biasing forces of the main spring 95, the second sub spring 99 and the sub spring 98. In this state, the rotation of the clutch outer 91 rotated by the primary gear 47 can be transmitted through the clutch discs 94 to the clutch center 92, and the main shaft 94 is rotated as one body with the clutch center 92.

When the pressure plate 93 is moved toward the primary driven gear 90 side against the biasing forces of the main spring 95, the second sub spring 99 and the sub spring 98 through the lifter cam plate 85, the clamping of the clutch discs 94 is released, resulting in a clutch disengaged state.

Figure 6:
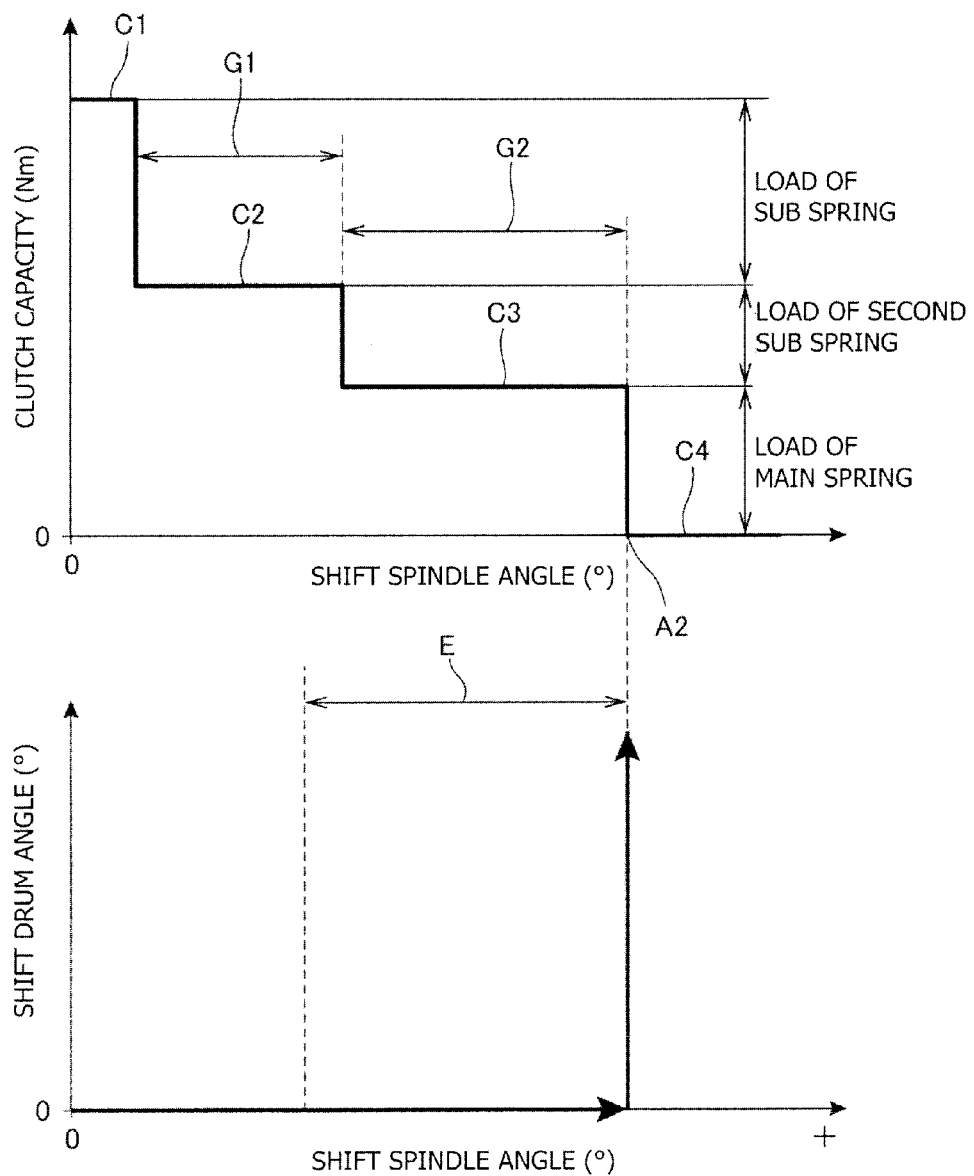
FIG. 6 is a diagram showing a clutch capacity of the change clutch and a rotational angle of a shift drum relative to a rotational angle of a shift spindle.

FIG. 6 is a diagram showing clutch capacity of the change clutch 61 and rotational angle of the shift drum 70 relative to rotational angle of the shift spindle 76. In the following description, a normal direction of rotation of the shift spindle 76 is the shift-up direction, and a negative direction of rotation of the shift spindle 76 is the shift-down direction.

As illustrated in FIG. 6, in this embodiment, the capacity of the change clutch 61 is variable as the springs contributing to the clutch capacity are changed according to the rotational angle of the shift spindle 76. Specifically, the clutch capacity is variable in a plurality of stages, including: a maximum capacity C1 wherein the clutch capacity is determined by the biasing forces of the main spring 95, the second sub spring 99 and the sub spring 98; a first intermediate capacity C2 wherein the clutch capacity is determined by the biasing forces of the main spring 95 and the second sub spring 99; a second intermediate capacity C3 wherein the clutch capacity is determined by the biasing force of only the main spring 95; and a disengagement capacity C4 wherein the biasing force of the main spring 95 is completely removed.

The maximum capacity C1 of the clutch capacity is obtained in the clutch engaged state depicted in FIG. 5. In this state, both the lifter plate 96 and the sub lifter plate 97 are in contact with the stopper plate 102, so that the biasing forces of the second sub spring 99 and the sub spring 98 are transmitted to the pressure plate 93. Therefore, the biasing force with which the pressure plate 93 presses the clutch discs 94 is a sum total of the biasing forces (loads) exerted by the main spring 95, the second sub spring 99 and the sub spring 98, and is at maximum.

In other words, the sub lifter plate 97 and the stopper plate 102 constitute a first sub spring load transmission path S1 along which the biasing force of the sub spring 98 is transmitted to the pressure plate 93. In addition, the lifter plate 96 and the stopper plate 102 constitute a second sub spring load transmission path S2 along which the biasing force of the second sub spring 99 is transmitted to the pressure plate 93.

When the lifter cam plate 85 is moved in a clutch-disengaging direction attendant on the rotation of the shift spindle 76 by the actuator mechanism 64 (FIG. 2), the sub lifter plate 97 is lifted along the lifter plate side bosses 106 toward the ring portion 105 side against the biasing force of the sub spring 98, thereby being separated from the stopper plate 102.

With the sub lifter plate 97 thus separated from the stopper plate 102, the first sub spring load transmission path S1 is interrupted, resulting in that the biasing force of the sub spring 98 is not transmitted to the pressure plate 93 any more. In this state, the clutch capacity is determined by the main spring 95 and the second sub spring 99. For this reason, as shown in FIG. 6, the clutch capacity is lowered from the maximum capacity C1 to the first intermediate capacity C2 the moment that the sub lifter plate 97 is separated from the stopper plate 102.

When the movement of the lifter cam plate 85 is continued after the sub lifter plate 97 is separated from the stopper plate 102, the sub lifter plate 97 continues moving further toward the ring portion 105 side so as to reduce the gap G1 (FIG. 5). The section from the separation of the pressing plate portion 113 of the sub lifter plate 97 from the stopper plate 102 to the contact thereof with the ring portion 105 is the section of the first intermediate capacity C2. In other words, the first intermediate capacity C2 is obtained in the section of lift amount of the lifter cam plate 85 corresponding to the magnitude of the gap G1.

In the section of the first intermediate capacity C2, the movement of the sub lifter plate 97 is a movement relative to the ring portion 105, and does not influence the loads of the main spring 95 and the second sub spring 99. For this reason, as shown in FIG. 6, in the section of the first intermediate capacity C2, the clutch capacity is determined by the main spring 95 and the second sub spring 99, and the first intermediate capacity C2 is constant. In the present embodiment, a play owing to the gap G1 is provided, so that the section in which the first intermediate capacity C2 is obtained can be elongated. Accordingly, the intermediate capacity of the clutch can be easily adjusted to a set point, without enhancing the accuracy of component parts or a control technique.

When the lifter cam plate 85 is lifted further in the clutch-disengaging direction from the state of the first intermediate capacity C2, the pressing plate portion 113 of the sub lifter plate 97 comes into contact with the ring portion 105, whereon the section of the first intermediate capacity C2 ends. Thereafter, when the lifter cam plate 85 is moved further in the clutch-disengaging direction, the lifter plate 96 is pressed through the sub lifter plate 97, and is lifted along the guide shaft portion 101b toward the stepped portion 101c side against the biasing force of the second sub spring 99, to be separated from the stopper plate 102.

With the tips of the lifter plate side bosses 106 of the lifter plate 96 separated from the stopper plate 102, the second sub spring load transmission path S2 is interrupted, resulting in that the biasing force of the second sub spring 99 is not transmitted to the pressure plate 93 any more. In this state, the clutch capacity is determined by only the main spring 95. For this reason, as shown in FIG. 6, the clutch capacity is lowered from the first intermediate capacity C2 to the second intermediate capacity C3 the moment that the lifter plate 96 is separated from the stopper plate 102.

When the movement of the lifter cam plate 85 is continued after the lifter plate 96 is separated from the stopper plate 102, the lifter plate 96 continues moving further toward the stepped portion 101c side so as to reduce the gap G2. The section from the separation of the lifter plate 96 from the stopper plate 102 to the contact thereof with the stepped portion 101c is the section of the second intermediate capacity C3. In other words, the second intermediate capacity C3 is obtained in the section of lift amount of the lifter cam plate 85 corresponding to the magnitude of the gap G2.

In the section of the second intermediate capacity C3, the movement of the lifter plate 96 is a movement relative to the stepped portion 101c, and does not influence the load of the main spring 95. For this reason, as shown in FIG. 6, in the section of the second intermediate capacity C3, the clutch capacity is determined by only the main spring 95, and the second intermediate capacity C3 is constant. In the present embodiment, a play owing to the gap G2 is provided, so that the section in which the second intermediate capacity C3 is obtained can be elongated. Accordingly, the intermediate capacity of the clutch can be easily adjusted to a set point, without enhancing the accuracy of component parts or a control technique.

When the lifter cam plate 85 is further lifted in the clutch-disengaging direction from the state of the second intermediate capacity C3, the lifter plate 96 comes into contact with the stepped portion 101c, whereon the section of the second intermediate capacity C3 ends. Thereafter, when the lifter cam plate 85 is further moved in the clutch-disengaging direction from this state, the pressure plate 93 is pressed through the sub lifter plate 97 and the lifter plate 96. As a result, the pressure plate 93 is moved in the clutch-disengaging direction, and the pressure plate 93 is separated from the clutch discs 94, whereby the clutch is disengaged.

At the time of an automatic shift, the control unit 17 selects a clutch capacity with which the shift shock can be reduced by driving the actuator mechanism 64 on the basis of the torque of the counter shaft 66. The selection of the clutch capacity can be performed by controlling the shift spindle 76 to a predetermined rotational angle. For example, at the time of shifting-up from the first speed to the second speed, the control unit 17 selects one of the maximum capacity C1, the first intermediate capacity C2 and the second intermediate capacity C3 so as to reduce the shift shock, on the basis of a pre-shift torque of the counter shaft 66 detected. Then, after changing the gear train in the transmission 60, the control unit 17 causes the change clutch 61 to be engaged at the selected clutch capacity. Specifically, the clutch capacity is so selected that the clutch capacity of the change clutch 61 will be within a band between the pre-shift torque of the counter shaft 66 and the post-shift torque of the counter shaft 66 or be at a value not deviated significantly from the band.

By this control, the rotational difference between the counter shaft 66 side and the crankshaft 23 side can be appropriately absorbed by the change clutch 61, and the shift shock can be reduced. Here, the pre-shift and post-shift torques of the counter shaft 66 can be obtained on the basis of a map in which relationships between engine rotational speed, throttle position and the torque of the counter shaft 66 are stored.

Figure 7:
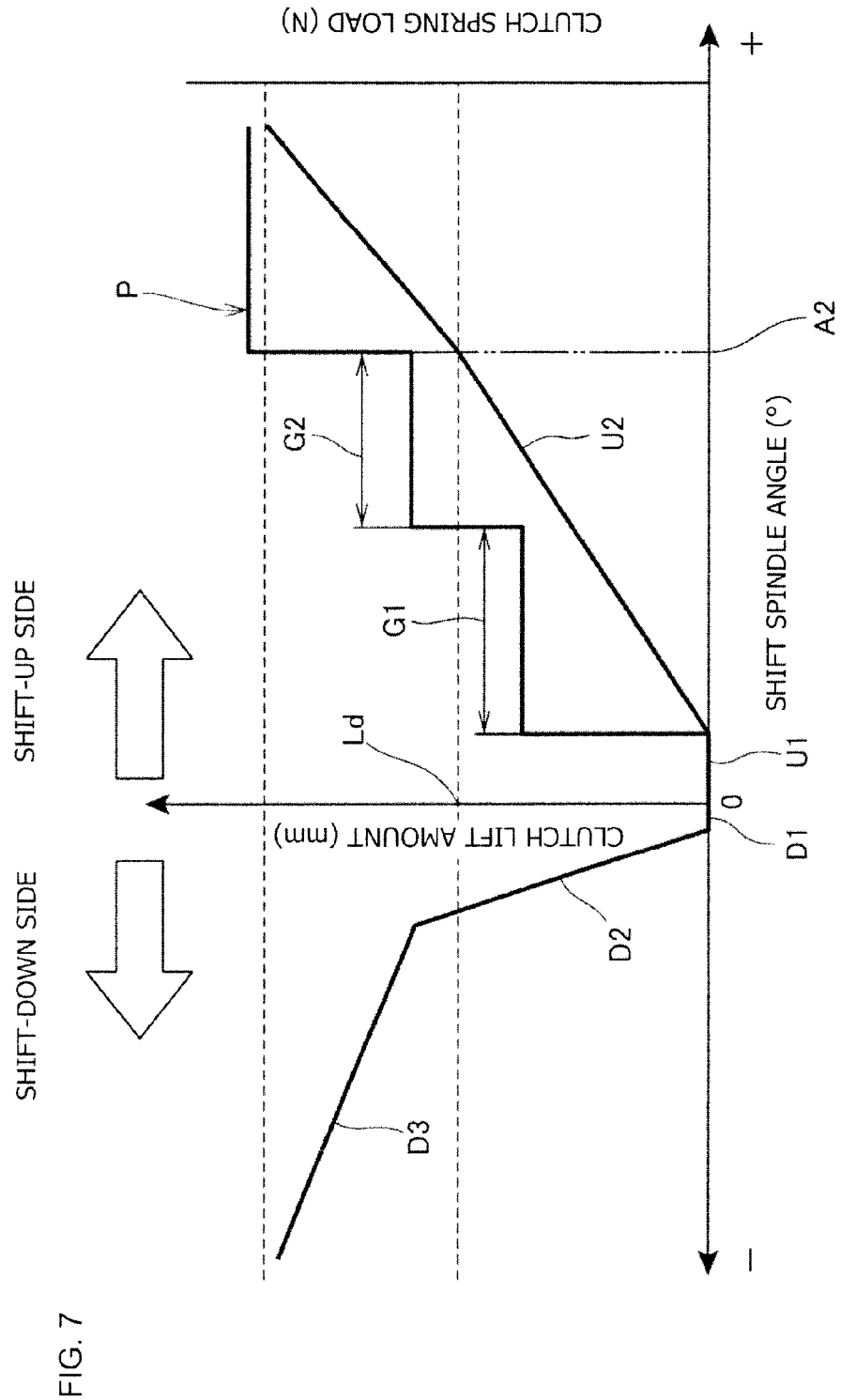
FIG. 7 is a diagram showing a lift amount of the lifter cam plate relative to the rotational angle of the shift spindle.

FIG. 7 is a diagram showing lift amount of the lifter cam plate 85 (clutch lift amount) relative to rotational angle of the shift spindle 76. Besides, in FIG. 7, on the shift-up side, load of the clutch spring relative to the rotational angle of the shift spindle 76 is shown.

As shown in FIG. 7, lift characteristics of the lifter cam plate 85 on the shift-up side include a play section U1 wherein the lift amount does not increase in response to rotation of the shift spindle 76 from a neutral position (0°) to a predetermined angle, and a lift section U2 wherein the lift amount increases substantially linearly with an increase in the rotational amount of the shift spindle 76.

Lift characteristics of the lifter cam plate 85 on the shift-down side include a play section D1 wherein the lift amount does not increase in response to rotation of the shift spindle 76 from the neutral position (0°) to a predetermined angle, a lift section D2 wherein the lift amount increases substantially linearly with an increase in the rotational angle of the shift spindle 76, and a lift section D3 wherein the lift amount increases substantially linearly, and at a gradient smaller than that in the lift section D2, with an increase in the rotational angle of the shift spindle 76.

The play section D1 is set smaller than the play section U1. In the lift section D2, the lift amount of the lifter cam plate 85 increases at a gradient greater than that in the lift section U2.

The lift characteristics of the lifter cam plate 85 are set to desired characteristics by regulating the shapes of the cam hole 85c of the lifter cam plate 85 and the cam hole 85c of the clutch lever 82.

Load P of the clutch spring on the shift-up side shown in FIG. 7 is a reaction force that the lifter cam plate 85 receives from the change clutch 61 when the shift spindle 76 is rotated in the shift-up direction, that is, a force required for progressively disengaging the change clutch 61. Since variations in the load P correspond to variations in the clutch capacity shown in FIG. 6, the corresponding sections are denoted by the same reference symbols as used above. The load P increases stepwise correspondingly to the stepwise reduction in the clutch capacity.

A rotational position A2 reached when the shift spindle 76 is rotated slightly in the clutch-disengaging direction after the gap G2 is reduced to zero is a rotational position of the shift spindle 76 at which the clutch is disengaged. The lift amount of the lifter cam plate 85 at the rotational position A2 is a disengagement lift amount Ld at which the clutch is disengaged.

The disengagement lift amount Ld is the same in both the shift-up direction and the shift-down direction. In the lift section D2, the lift amount of the lifter cam plate 85 increases more rapidly than in the lift section U2. Therefore, in the shift-down direction, the clutch is disengaged at a smaller rotational amount of the shift spindle 76 than that in the shift-up direction.

As shown in FIG. 6, at the time of shifting-up, accumulation of a force by the force accumulation mechanism 81 is started at a stage before disengagement of the clutch. At the rotational position A2, the clutch is disengaged, whereby restraint on the change mechanism 89 by the transmission 60 is released, and the shift drum 70 is rotated at a stroke by the force accumulated in the force accumulation mechanism 81, resulting in a shift-up. A force accumulation section E in which a force is accumulated in the force accumulation mechanism 81 is the section from an intermediate position of the first intermediate capacity C2 to the rotational position A2.

Figure 8:
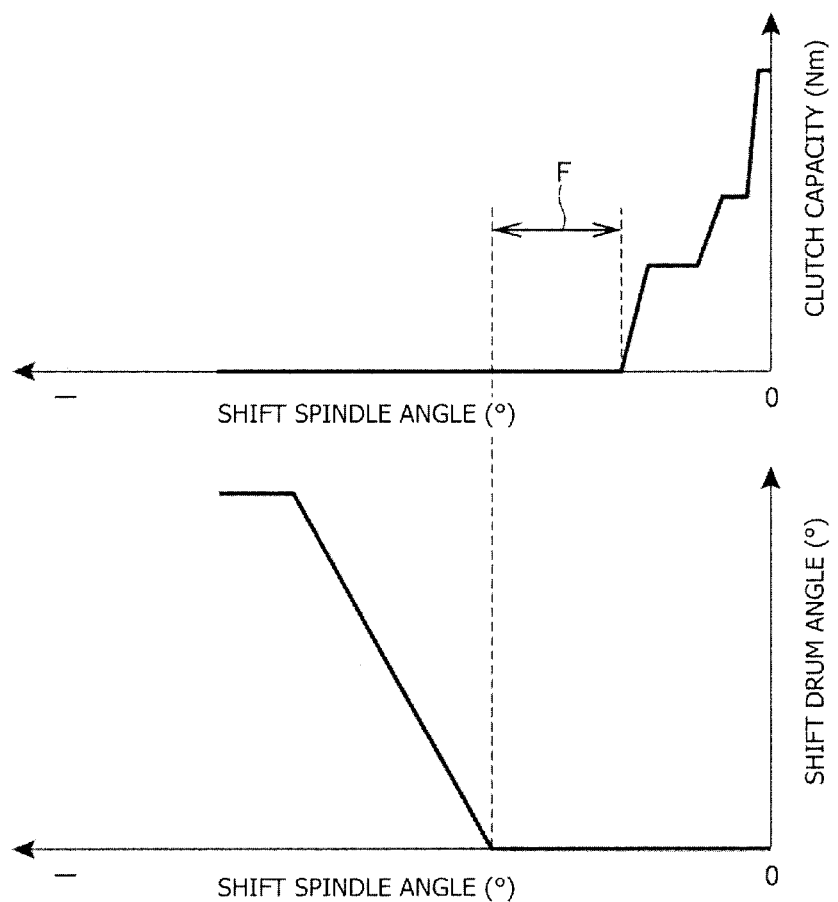
FIG. 8 is a diagram showing the clutch capacity of the change clutch and the rotational angle of the shift drum relative to the rotational angle of the shift spindle during a shift-down.

FIG. 8 is a diagram showing clutch capacity of the change clutch 61 and rotational angle of the shift drum 70 in relation to rotational angle of the shift spindle 76 at the time of shifting-down.

At the time of shifting-down, stepwise control of clutch capacity is not conducted, and, in response to rotation of the shift spindle 76, the change clutch 61 is disengaged to the disengagement capacity C4 at a stroke.

When the shift spindle 76 is rotated in the shift-down direction by a predetermined amount F after the change clutch 61 is completely disengaged, rotation of the shift drum 70 is started through the master arm 80, and a shift-down is performed.

The shift shock upon the shift-down is reduced by the back torque limiter mechanism.

Figure 9:
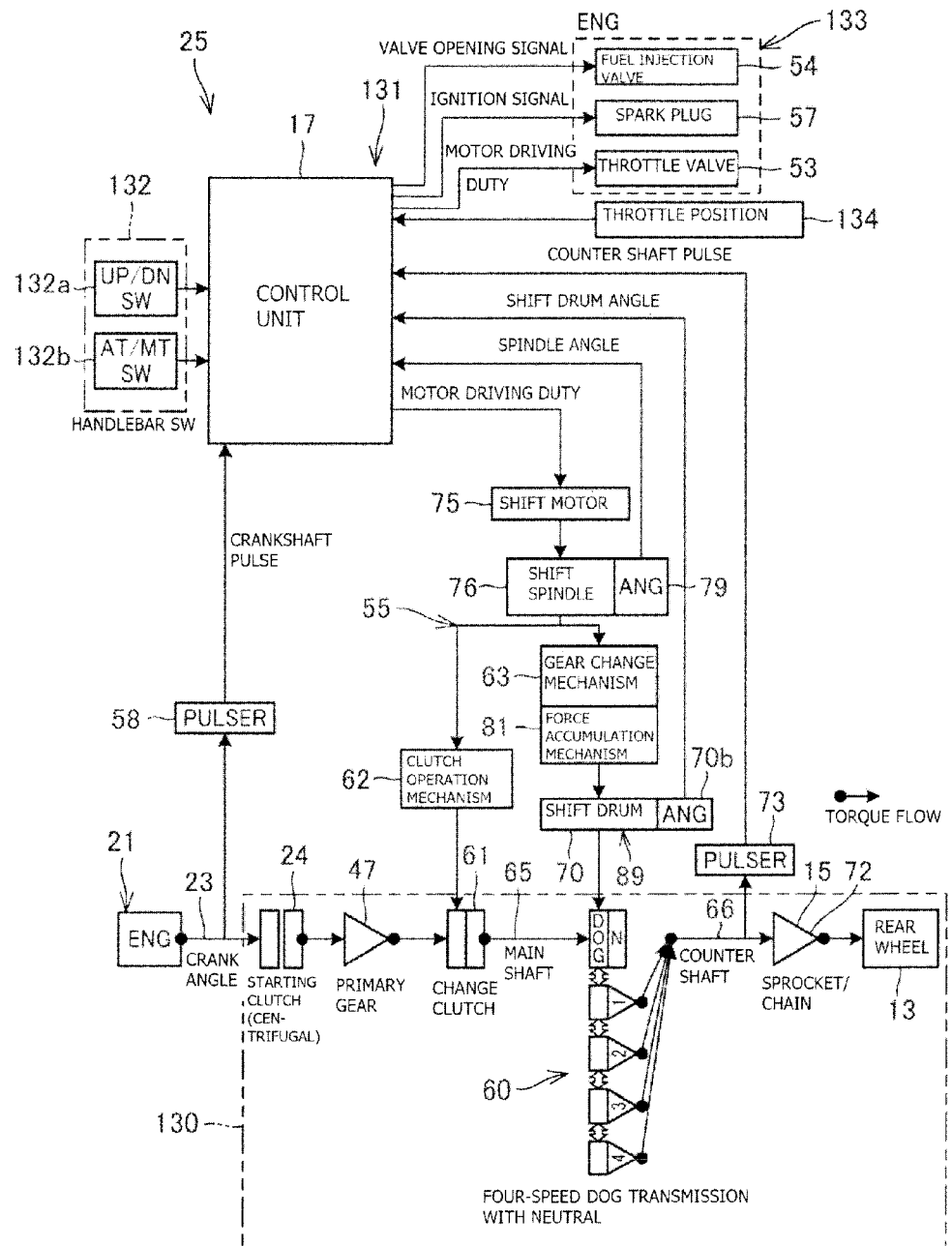
FIG. 9 is a block diagram showing the configuration of the automatic speed change apparatus.

FIG. 9 is a block diagram showing the configuration of the automatic speed change apparatus 25.

As shown in FIG. 9, the automatic speed change apparatus 25 includes a drive transmission unit 130 including the starting clutch 24, the primary gear 47, the change clutch 61, the main shaft 65, the transmission 60, the counter shaft 66, the chain 15, the sprocket 72 and the rear wheel 13. An actuator mechanical unit 55 is configured to mechanically operate the transmission 60 and the change clutch 61, an electrical unit 131 and an engine operation control unit 133 are configured to directly control the operation of the engine 21.

The drive transmission unit 130 mechanically transmits the power of the crankshaft 23 to the rear wheel 13.

The actuator mechanical unit 133 includes the shift motor 75, the shift spindle 76, the gear change mechanism 63, the force accumulation mechanism 81, the change mechanism 89, and the clutch operation mechanism 62.

The engine operation control unit 133 includes the throttle valve 53, the fuel injection valve 54, and a spark plug 57.

The throttle valve 53 is, in this example, an electronically controlled one. Specifically, the throttle valve 53 is driven by a throttle valve driving motor (not shown) controlled by the control unit 17. More specifically, the control unit 17 detects, using a sensor, an operation amount of a throttle grip (not shown) provided on the handlebar 11 and operated by the driver, and drives the throttle valve driving motor according to the operation amount, thereby controlling the position (angle) of the throttle valve 53.

The spark plug 57 is connected to the control unit 17 through an ignition coil driving section and an ignition coil (both not shown).

The electrical unit 131 includes the control unit 17, an engine rotational speed sensor 58 (rotational speed sensor), the spindle angle sensor 79, the gear position sensor 70b, a throttle position sensor 134, the vehicle speed sensor 73, and a handlebar switch 132 provided on the handlebar 11.

The control unit 17 includes a CPU, and a storage section including a ROM, a RAM and the like. On the basis of control data such as a control map in the storage section, the control unit 17 controls the actuator mechanical unit 55 and the engine operation control unit 133.

The engine rotational speed sensor 58 outputs the rotational speed of the crankshaft 23 to the control unit 17.

The control unit 17 can determine the state of the transmission 60, that is, whether the transmission 60 is being shifted or not, on the basis of the value detected by the spindle angle sensor 79.

The gear position sensor 70b outputs the rotational angle of the shift drum 70 to the control unit 17. On the basis of the rotational angle, the control unit 17 determines the current gear position (current shift position).

The throttle position sensor 134 outputs the position (angle) of the throttle valve 53 to the control unit 17.

The handlebar switch 132 includes the mode switch 132b and the shift selection switch 132a.

On the basis of signals from the engine rotational speed sensor 58, the spindle angle sensor 79, the gear position sensor 70b, the throttle position sensor 134, and the vehicle speed sensor 73, the control unit 17 controls the shift motor 75 to automatically perform a shift operation and a clutch operation.

In addition, the control unit 17 controls the position of the throttle valve 53, the injection amount of the fuel injection valve 54, and the ignition timing of the spark plug 57, according to the operation amount of the throttle grip. In this case, the control unit 17 corrects the position of the throttle valve 53, the injection amount of the fuel injection valve 54, and the ignition timing of the spark plug 57, on the basis of values detected by the throttle position sensor 134, the engine rotational speed sensor 58, the spindle angle sensor 79, the gear position sensor 70b, and the vehicle speed sensor 73.

Figure 10:
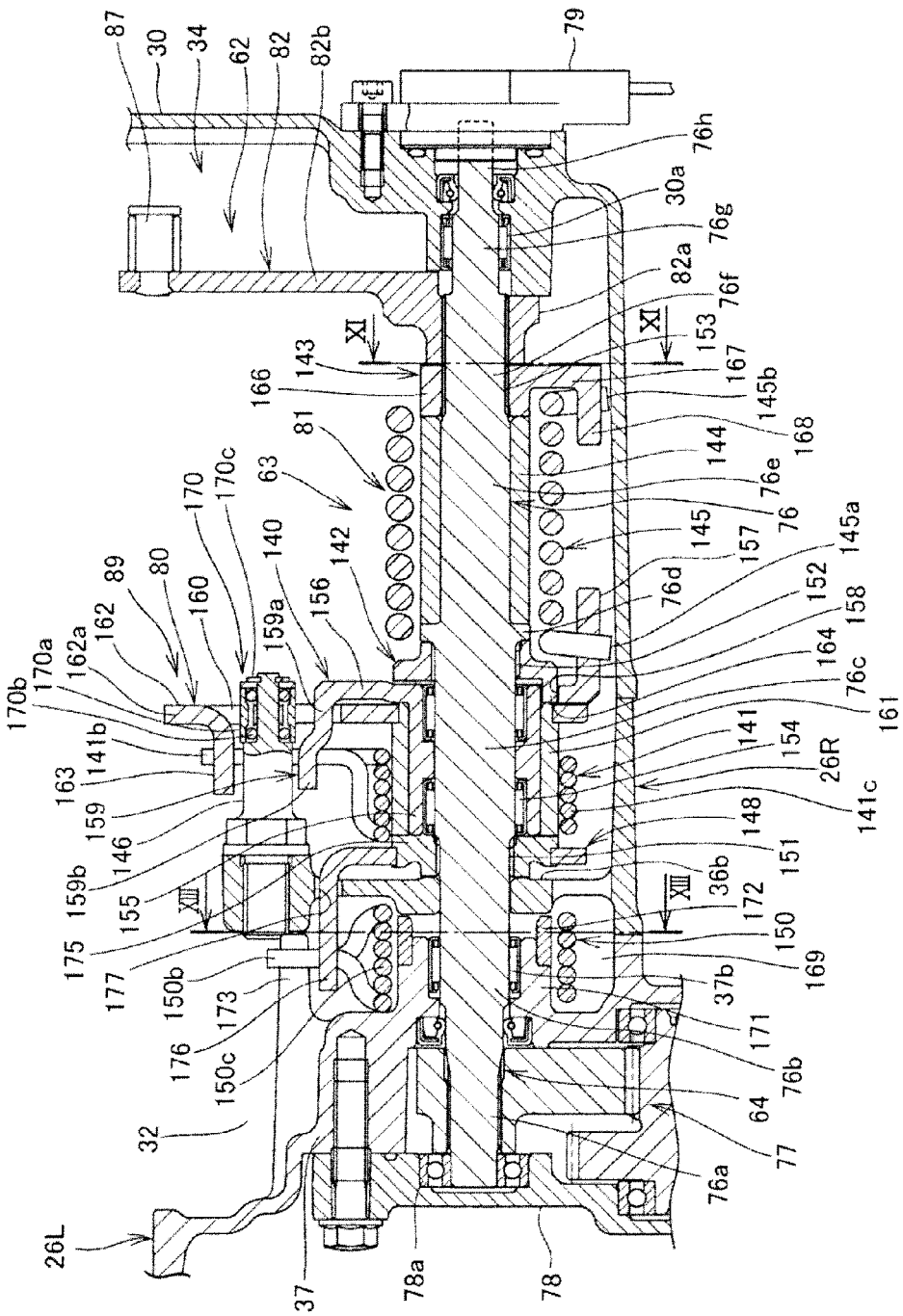
FIG. 10 is a sectional view of a force accumulation mechanism.

FIG. 10 is a sectional view of the force accumulation mechanism 81.

The wall portion 36 of the other-side case half 26R is provided, in the periphery of the shift spindle 76, with an inner wall 36b (inner wall near the faying portion) formed in the vicinity of the faying surface 26F of the crankcase 26.

The force accumulation mechanism 81 is disposed between the inner wall 36b of the wall portion 36 of the other-side case half 26R and the clutch cover 30.

The force accumulation mechanism 81 includes the shift spindle 76, and a gear shift arm 140 provided on a shaft of the shift spindle 76 so as to be rotatable relative to the shift spindle 76. A return spring 141 biases the gear shift arm 140 toward a neutral position. A shift-down collar 142 is fixed on the shaft of the shift spindle 76 at a position proximate to the gear shift arm 140 and rotated as one body with the shift spindle 76, and a force accumulation collar 143 is fixed on the shaft of the shift spindle 76 at a position spaced axially from the gear shift arm 140 and rotated as one body with the shift spindle 76.

In addition, the force accumulation mechanism 81 includes a spring collar 144 provided on the shaft of the shift spindle 76 between the force accumulation collar 143 and the gear shift arm 140 so as to be rotatable relative to the shift spindle 76. A force accumulation spring 145 is wound around the outer circumference of the spring collar 144 between the force accumulation collar 143 and the gear shift arm 140. A stopper pin 146 (stopper portion) is configured to restrict the rotational position of the master arm 80. The stopper pin 146 is fixed to the wall portion 36 of the other-side case half 26R.

The gear change mechanism 63 includes a sub return spring locking collar 148 fixed on the shift spindle 76 adjacently to the force accumulation mechanism 81, and a sub return spring 150 connected to the sub return spring locking collar 148 and biasing the shift spindle 76 toward a neutral position.

The shift spindle 76 includes, in order from the cover 78 side, a connection portion 76a connected to the speed reduction gear train 77, and a support portion 76b supported by the bearing portion 37a and penetrating the inner wall 36b. A gear shift arm support portion 76c supports the gear shift arm 140, and a flange portion 76d projects radially. A spring collar support portion 76e supports the spring collar 144, and a collar support portion 76f supports the force accumulation collar 143. A support portion 76g is supported by the bearing 30a, and a sensor connection portion 76h connected to the spindle angle sensor 79.

Of the shift spindle 76, the flange portion 76d is the largest in diameter, while the gear shift arm support portion 76c, the support portion 76b, and the connection portion 76a are formed to be reduced stepwise in diameter toward the side of the connection portion 76a. In addition, the spring collar support portion 76e, the collar support portion 76f, the support portion 76g, and the sensor connection portion 76h are formed to be reduced stepwise in diameter from the flange portion 76d side toward the sensor connection portion 76h.

The support portion 76b is provided with a locking collar fixing portion 151 to which the sub return spring locking collar 148 is fixed. The gear shift arm support portion 76c is provided, at a position adjacent to the flange portion 76d, with a shift-down collar fixing portion 152 to which the shift-down collar 142 is fixed. The collar support portion 76f is provided with a force accumulation collar fixing portion 153 to which the force accumulation collar 143 is fixed. The locking collar fixing portion 151, the shift-down collar fixing portion 152, and the force accumulation collar fixing portion 153 are serrations formed at an outer circumference of the shift spindle 76. Besides, the clutch lever 82 is fixed to the force accumulation collar fixing portion 153.

The sub return spring locking collar 148, the shift-down collar 142, the force accumulation collar 143, and the clutch lever 82 are fixed to be non-rotatable relative to the shift spindle 76, and are each rotated as one body with the shift spindle 76.

Figure 11:
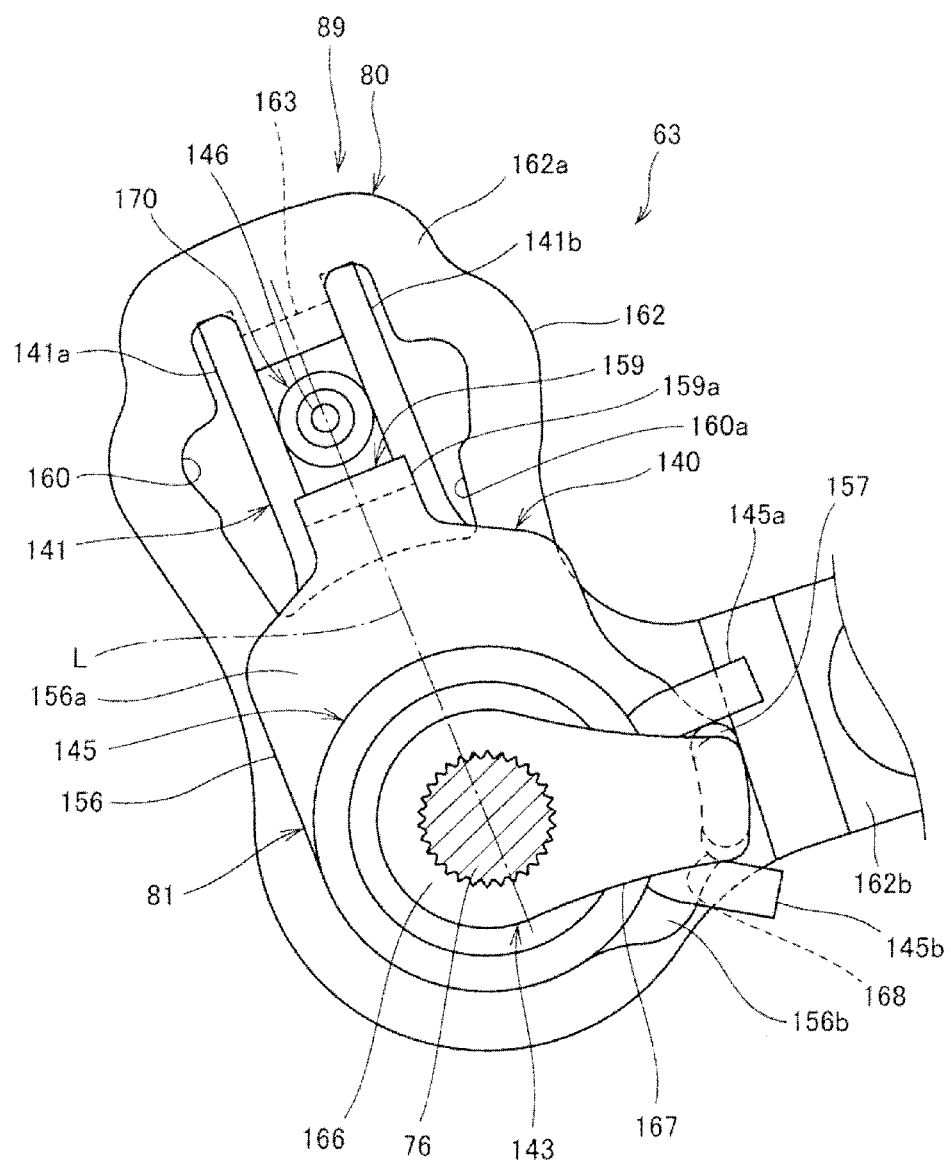
FIG. 11 is a sectional view taken along line XI-XI of FIG. 10, showing a peripheral part of the force accumulation mechanism.
Figure 12A:
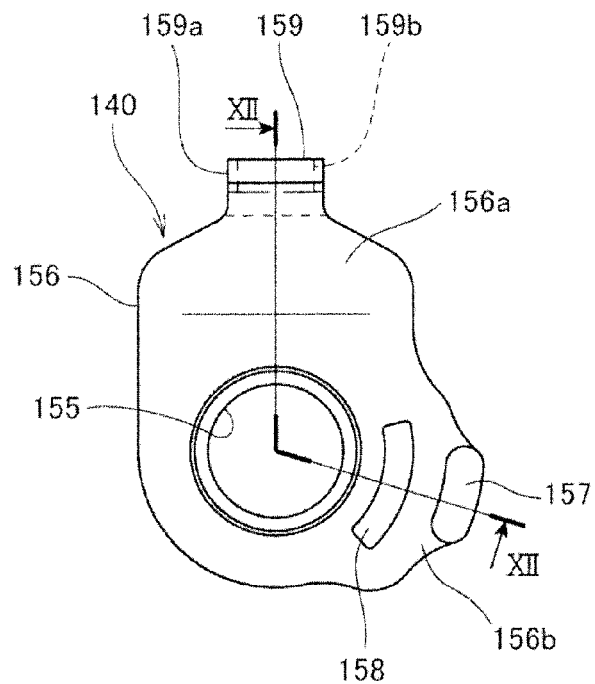
FIG. 12(a) illustrates a front view of a gear shift arm.
Figure 12B:
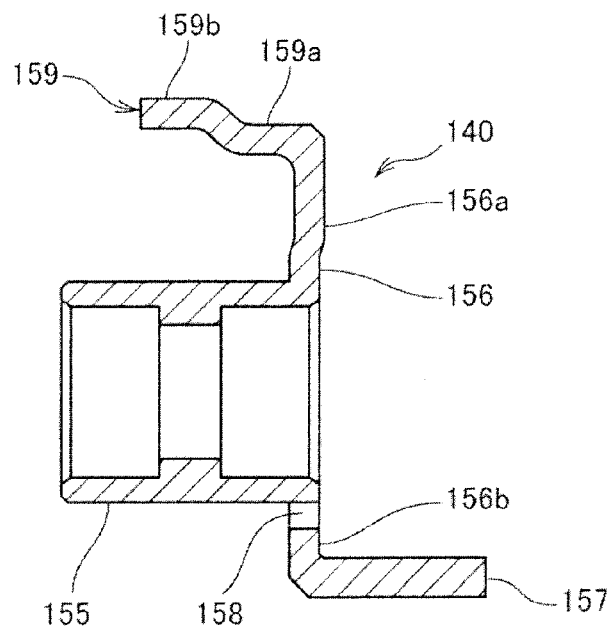
FIG. 12(b) is a sectional view taken along line XII-XII of 12(a).

FIG. 11 is a sectional view taken along line XI-XI of FIG. 10, showing a peripheral part of the force accumulation mechanism 81. FIGS. 12(a) and 12(b) illustrate the gear shift arm 140, wherein 12(a) is a front view, and 12(b) is a sectional view taken along line XII-XII of 12(a). Here, in FIG. 11, the actuator mechanism 64, the force accumulation mechanism 81 and the change mechanism 89 are each in a neutral state (neutral position) in which neither shifting-up nor shifting-down is being conducted. In other words, in FIG. 11, the shift spindle 76, the gear shift arm 140, the master arm 80 and the like are in their neutral state. In addition, the clutch cover 30 is not depicted in FIG. 11.

As shown in FIGS. 10-11, 12(a), and 12(b), the gear shift arm 140 includes a cylindrical portion 155 and a plate portion 156. The cylindrical portion 155 is fitted to an outer circumferential surface of the shift spindle 76 through a bearing 154. The plate portion 156 extends radially outward from an outer circumferential portion of an end, on the force accumulation spring 145 side, of the cylindrical portion 155.

The plate portion 156 includes an upward extension portion 156a extending upward from the cylindrical portion 155, and an extension portion 156b extending from the cylindrical portion 155 in a direction substantially orthogonal to the upward extension portion 156a.

The extension portion 156b is provided with a first locking piece 157 extending substantially in parallel to the shift spindle 76 from a tip portion of the extension portion 156b toward the force accumulation spring 145 side. In addition, the plate portion 156 is provided, between the cylindrical portion 155 and the first locking piece 157, with a hole 158 in which part of the shift-down collar 142 is fitted. The hole 158 is an arc-shaped slot extending along the cylindrical portion 155.

The upward extension portion 156a is provided with a second locking piece 159 which extends radially outward from a tip portion of the upward extension portion 156a and then extends substantially in parallel to the shift spindle 76 toward the return spring 141 side.

The second locking piece 159 includes a base end side contact portion 159a passed through a restriction opening 160 of the master arm 80, and a tip-side return spring locking portion 159b to which the return spring 141 is fixed. The return spring locking portion 159b is formed to be slenderer than the contact portion 159a.

The master arm 80 includes a cylindrical portion 161 and an arm portion 162. The cylindrical portion 161 is slidably fitted to an outer circumferential surface of the cylindrical portion 155 of the gear shift arm 140. The arm portion 162 extends radially outward from an end, on the force accumulation spring 145 side, of the cylindrical portion 161. The master arm 80 is rotatable relative to the gear shift arm 140. The master arm 80 is disposed so that the arm portion 162 is proximate to the plate portion 156 of the gear shift arm 140.

The arm portion 162 is formed in a roughly L shape in front view shown in FIG. 11. The arm portion 162 includes a position restriction arm 162a extending upward from the cylindrical portion 161, and an operation arm 162b extending from the cylindrical portion 161 in a direction substantially orthogonal to the position restriction arm 162a. The master arm 80 is connected to the shift drum 70 through the operation arm 162b. Rotation of the master arm 80 rotates the shift drum 70.

The master arm 80 is provided, at a tip portion of the position restriction arm 162a, with the restriction opening 160 through which the stopper pin 146 is passed. The second locking piece 159 of the gear shift arm 140 is passed through the restriction opening 160, at a position downwardly of the stopper pin 146. The restriction opening 160 has a predetermined width such that the stopper pin 146 and the second locking piece 159 can be moved relative to and within the restriction opening 160.

The master arm 80 is provided, at an upper edge portion of the restriction opening 160, with a spring locking piece 163 extending substantially in parallel to the shift spindle 76 toward the return spring 141 side.

The shift-down collar 142 is formed in a cylindrical shape, is axially positioned by abutment on the flange portion 76d, and is fixed to the shift-down collar fixing portion 152. The shift-down collar 142 has a dog tooth 164 inserted in the hole 158 in the gear shift arm 140. The whole length of the dog tooth 164 is set shorter than the whole length of the hole 158 so that the dog tooth 164 can move within the hole 158.

The force accumulation collar 143 includes a cylindrical portion 166 fixed to the force accumulation collar fixing portion 153, and an extension portion 167 extending radially outward from the cylindrical portion 166. A force accumulation arm 168 extends substantially in parallel to the shift spindle 76 from the tip of the extension portion 167 toward the gear shift arm 140 side. As viewed in the axial direction of the shift spindle 76, the force accumulation arm 168 is disposed at substantially the same position, radially and circumferentially, as the first locking piece 157 of the gear shift arm 140. Specifically, the force accumulation arm 168 is provided at a position slightly deviated from the first locking piece 157 in the circumferential direction.

The spring collar 144 is disposed between the flange portion 76d and the force accumulation collar 143. The spring collar 144 rotates relative to the shift spindle 76 when the inner circumferential portion of the force accumulation spring 145 makes contact with the spring collar 144, thereby reducing the friction on the force accumulation spring 145.

The force accumulation spring 145 is a torsion coil spring. A gear shift arm side end portion 145a at one end of the force accumulation spring 145 is locked onto the first locking piece 157 of the gear shift arm 140. A force accumulation arm side end portion 145b at the other end of the force accumulation spring 145 is locked onto the force accumulation arm 168 of the force accumulation collar 143.

The return spring 141 is a torsion coil spring, a coil portion 141c of which is fitted to an outer circumferential portion of the cylindrical portion 161 of the master arm 80.

The return spring 141 has its one end 141a and other end 141b extending radially outward. The one end 141a and the other end 141b are provided to be substantially parallel to each other, with a predetermined spacing therebetween.

The return spring 141 is disposed in a state in which the stopper pin 146 is interposed between its one end 141a and its other end 141b.

In addition, the spring locking piece 163 of the master arm 80 is clamped between the one end 141a and the other end 141b, on the more tip side of the one end 141a and the other end 141b than the stopper pin 146. The second locking piece 159 of the gear shift arm 140 is retained between the one end 141a and the other end 141b, on the more base end side of the one end 141a and the other end 141b than the stopper pin 146.

The stopper pin 146 is fixed by fastening to the inner wall 36b of the other-side case half 26R. The stopper pin 146 extends substantially in parallel to the shift spindle 76, and is passed through the restriction opening 160 of the master arm 80. The stopper pin 146 is provided with a damper portion 170 at a tip portion thereof. The damper portion 170 includes a cylindrical collar 170a fitted to the stopper pin 146, and an elastic member 170b such as rubber interposed between the collar 170a and the stopper pin 146. A washer-shaped fixture 170c is fitted to the tip of the stopper pin 146 so as to prevent the collar 170a from slipping off. An inner circumferential portion of the restriction opening 160 of the master arm 80 comes into contact with the damper portion 170 when the master arm 80 is rotated. Therefore, an impact sound generated when the restriction opening 160 is received by the stopper pin 146 can be reduced by the damper portion 170.

Figure 13:
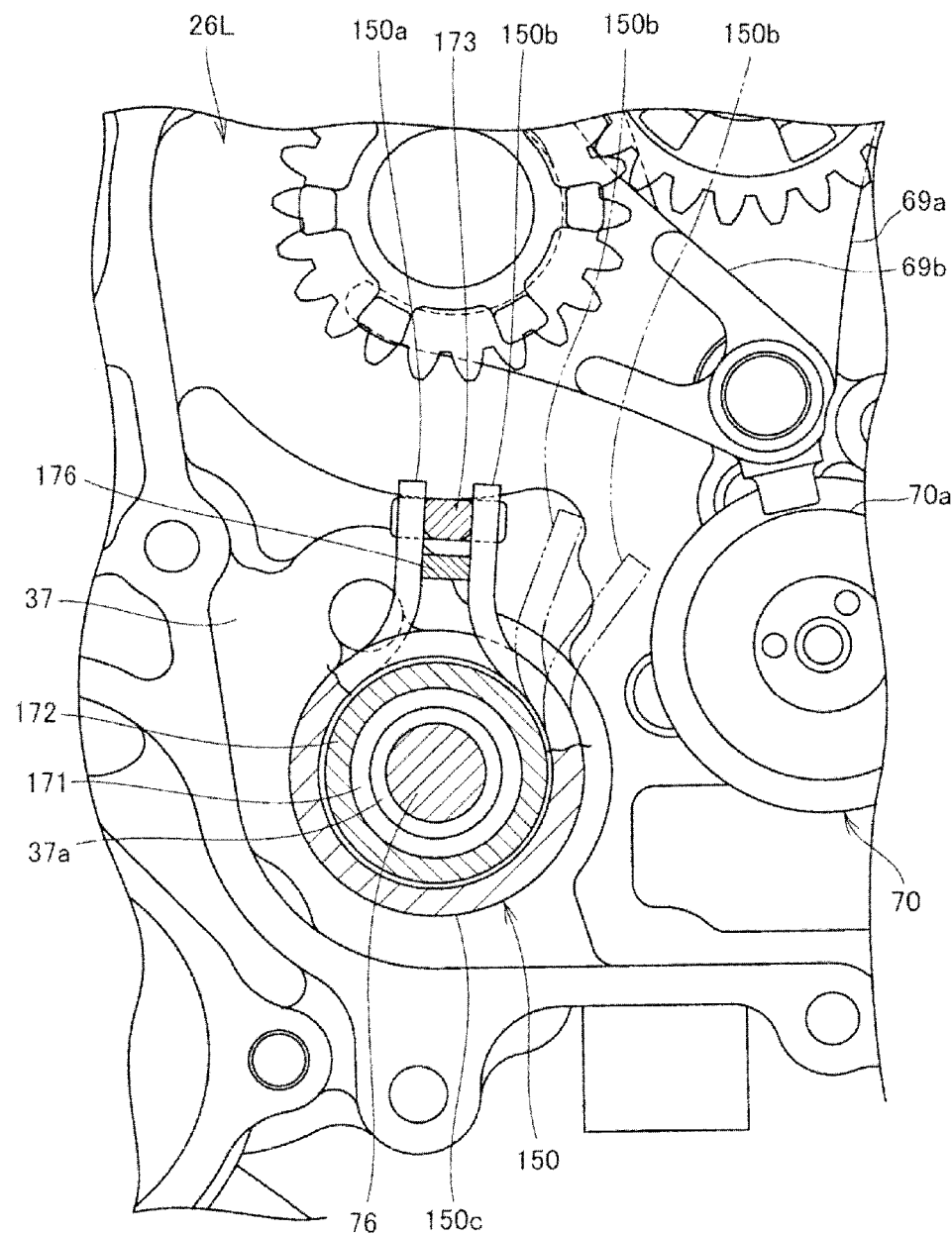
FIG. 13 is a sectional view taken along line XIII-XIII of FIG. 10.
Figure 14:
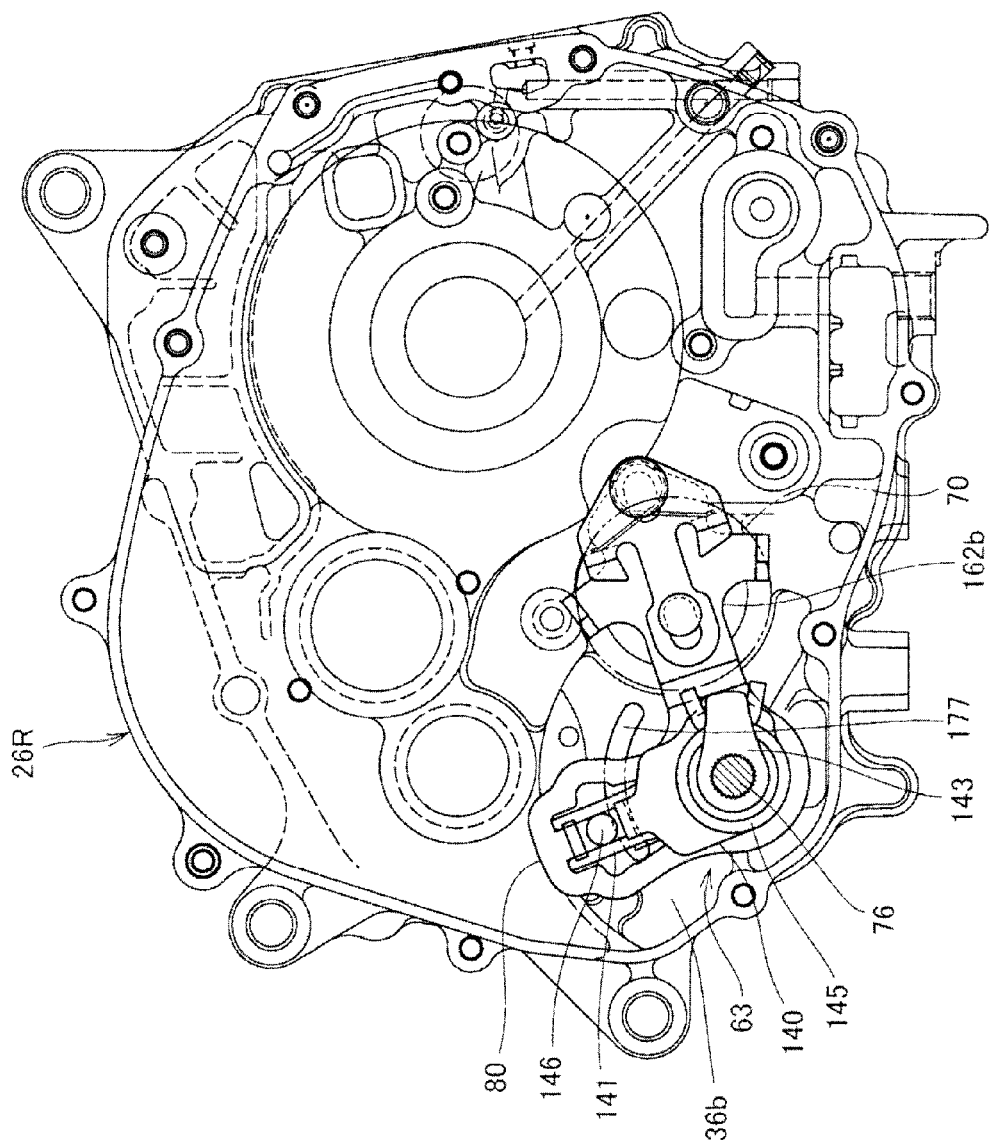
FIG. 14 is a sectional view taken along line XI-XI of FIG. 10.

FIG. 13 is a sectional view taken alone line XIII-XIII of FIG. 10. FIG. 14 is a sectional view taken along line XI-XI of FIG. 10. Here, FIG. 13 illustrates a neutral state. The clutch cover 30 is not shown in FIG. 14.

As shown in FIG. 10, the wall portion 37 of the one-side case half 26L is located on the outer side of the inner wall 36b of the other-side case half 26R. In a space 169 inside the transmission chamber 32 between the wall portion 37 and the inner wall 36b, there is provided a cylindrical sub return spring support portion 171 which projects along the shift spindle 76 from the wall portion toward the inner wall 36b side. The bearing 37b supporting the shift spindle 76 is supported on an inner circumferential portion of the sub return spring support portion 171.

At the tip of the sub return spring support portion 171, there is provided a stepped portion which is hollowed in the circumferential direction. A cylindrical guide collar 172 is fixed to the stepped portion. An outer circumferential portion of the guide collar 172 and an outer circumferential portion of a base end portion of the sub return spring support portion 171 are flush with each other.

The wall portion 37 is provided, in the vicinity of the sub return spring support portion 171, with a boss 173 extending substantially in parallel to the shift spindle 76. The boss 173 and the sub return spring support portion 171 are formed to be integral with the wall portion 37, and their tip portions extend into the vicinity of the inner wall 36b.

The sub return spring 150 is a torsion coil spring. The sub return spring 150 includes a coil portion 150c, and one end 150a and the other end 150b projecting radially outward from both ends of the coil portion 150c, respectively.

The sub return spring 150 is supported by fitting of an inner circumferential portion of the coil portion 150c to an outer circumferential portion of the sub return spring support portion 171, and is disposed in the space 169.

The sub return spring 150 is disposed in a state in which the boss 173 is clamped between its one end 150a and its other end 150b. The sub return spring 150 is circumferentially positioned by the boss 173.

As illustrated in FIGS. 10 and 13, the sub return spring locking collar 148 is disposed between the inner wall 36b of the other-side case half 26R and the master arm 80, and is located inside the clutch chamber 34. In addition, the sub return spring locking collar 148 is located between the inner wall 36b and the return spring 141.

The sub return spring locking collar 148 includes a cylindrical portion 175 and an arm portion 176. The cylindrical portion 175 is fixed to the locking collar fixing portion 151 of the shift spindle 76. The arm portion 176 extends radially outward from the cylindrical portion 175, then bends to a side opposite to the return spring 141, and extends toward the sub return spring 150 side.

The inner wall 36b is provided with a hole 177 through which the arm portion 176 of the sub return spring locking collar 148 is passed. The hole 177 is formed in an arcuate shape corresponding to a rotational trajectory of the arm portion 176. The arm portion 176 is passed through the hole 177 to extend into the space 169, and is clamped between the one end 150a and the other end 150b of the sub return spring 150 at a position between the boss 173 and the coil portion 150c.

In the neutral state shown in FIG. 11, the change clutch 61 is in an engaged state, and a driving force is generated in the transmission 60. Therefore, the master arm 80 is arrested by the transmission 60 and is non-rotatable on the shift spindle 76.

In the neutral condition, the master arm 80 has its spring locking piece 163 clamped between the one end 141a and the other end 141b of the return spring 141, whereby the rotational position of the master arm 80 is restricted to a neutral position. The return spring 141 restricts the rotational position of the master arm 80 in a state in which a predetermined initial load is exerted thereon.

In the neutral state, the gear shift arm 140 has its return spring locking portion 159b clamped between the one end 141a and the other end 141b of the return spring 141, whereby the rotational position of the gear shift arm 140 is restricted to a neutral position. The return spring 141 restricts the rotational position of the gear shift arm 140 in a state in which the predetermined initial load is exerted thereon.

In other words, in the neutral condition, the master arm 80 and the gear shift arm 140 are so located as to be along a straight line L passing through the center of the shift spindle 76 and the center of the stopper pin 146.

In the neutral condition, the force accumulation spring 145 is provided in a state in which an initial bend corresponding to a predetermined torsion amount is imparted thereto between the force accumulation arm 168 and the first locking piece 157. In this state, a predetermined initial load is generated in the force accumulation spring 145.

As shown in FIG. 13, in the neutral condition, the sub return spring locking collar 148 has its arm portion 176 clamped between the one end 150a and the other end 150b of the sub return spring 150, whereby rotational position of the sub return spring locking collar 148 is restricted to a neutral position. The sub return spring 150 restricts the rotational position of the sub return spring fixing collar 148 in a state in which a predetermined initial load is exerted thereon.

FIGS. 15(a)-15(d) illustrate positional states of the dog tooth 164 of the shift-down collar 142, wherein 15(a) shows a neutral state, and 15(b) to 15(d) show respective states of sequentially increased rotational amounts of the shift spindle 76.

Figure 15A:
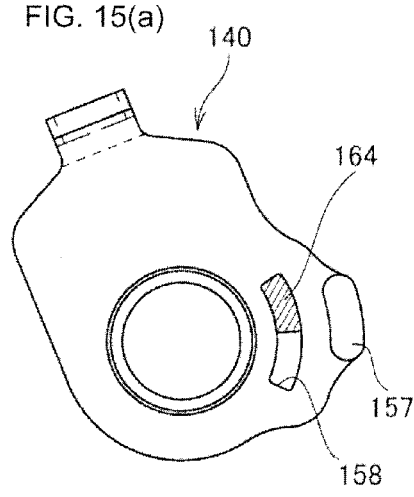
FIGS. 15(a)-15(d) illustrate positional states of a dog tooth of a shift-down collar, wherein 15(a) shows a neutral state, and 15(b) to 15(d) show states of sequentially increased rotational amounts of the shift spindle.

As shown in FIG. 15(a), in the neutral state, the dog tooth 164 is in contact with one end of the hole 158 of the gear shift arm 140, with a gap formed between the dog tooth 164 and the other end of the hole 158.

Here, an operation of the force accumulation mechanism 81 at the time of shifting-up will be described.

When the shift motor 75 of the actuator mechanism 64 is driven in response to a shift command from the control unit 17, rotation of the shift spindle 76 is started. The shift-up direction is the clockwise direction indicated by symbol UP in the figure.

Figure 16:
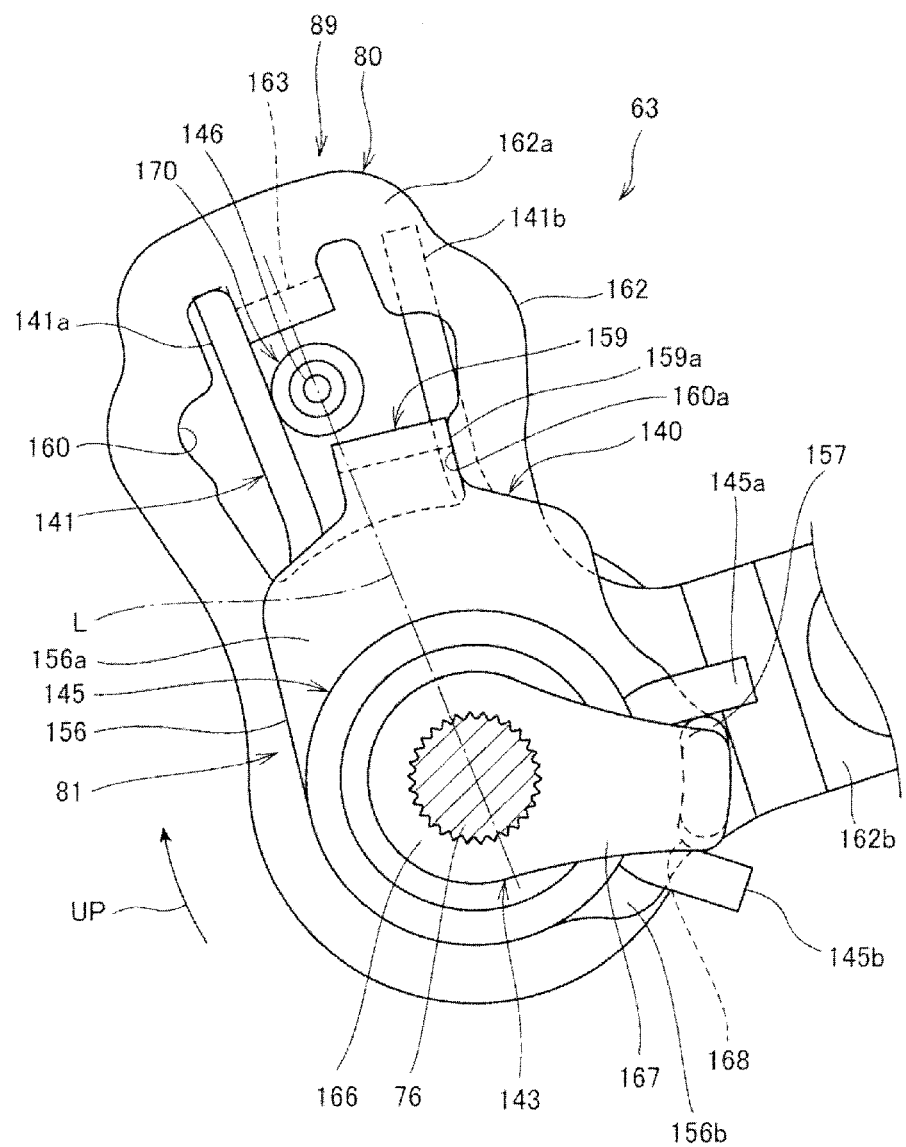
FIG. 16 illustrates a state advanced in a shift-up direction from the neutral state.

FIG. 16 illustrates a state advanced in a shift-up direction from the neutral state.

The state illustrated in FIG. 16 is a state in which rotation of the shift spindle 76 has advanced to such an extent that the contact portion 159a of the second locking piece 159 of the gear shift arm 140 makes contact with an inner edge 160a of the restriction opening 160 in the master arm 80 so that the gear shift arm 140 cannot be rotated any more. In the following description, this state will be referred to as force accumulation preparatory state.

In the force accumulation preparatory state, the gear shift arm 140 has only rotated as one body with the force accumulation collar 143 through the force accumulation spring 145 attendantly on rotation of the force accumulation collar 143. Therefore, although the force accumulation mechanism 81 has rotated as a whole in a shift-up direction, bending amount of the force accumulation spring 145 has not been changed at all, and force accumulation has not been started yet. Besides, in the force accumulation preparatory state, the rotational amount of the master arm 80 from the neutral state is zero.

In the force accumulation preparatory state, the gear shift arm 140 has been rotated against a biasing force of the return spring 141, and the other end 141b of the return spring 141 is opened by a predetermined amount.

In addition, in the force accumulation preparatory state, the sub return spring locking collar 148 has been rotated against a biasing force of the sub return spring 150, and the other end 150b of the sub return spring 150 is opened by a predetermined amount, as indicated by alternate long and two short dashes line in FIG. 13.

Figure 15B:
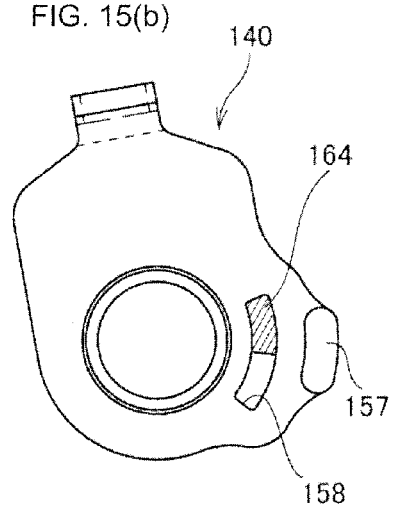

In the force accumulation preparatory state, the shift-down collar 142 is rotated as one body with the gear shift arm 140. As shown in FIG. 15(b), therefore, the dog tooth 164 is in contact with one end of the hole 158 in the gear shift arm 140, with a gap formed between the dog tooth 164 and the other end of the hole 158.

Figure 17:
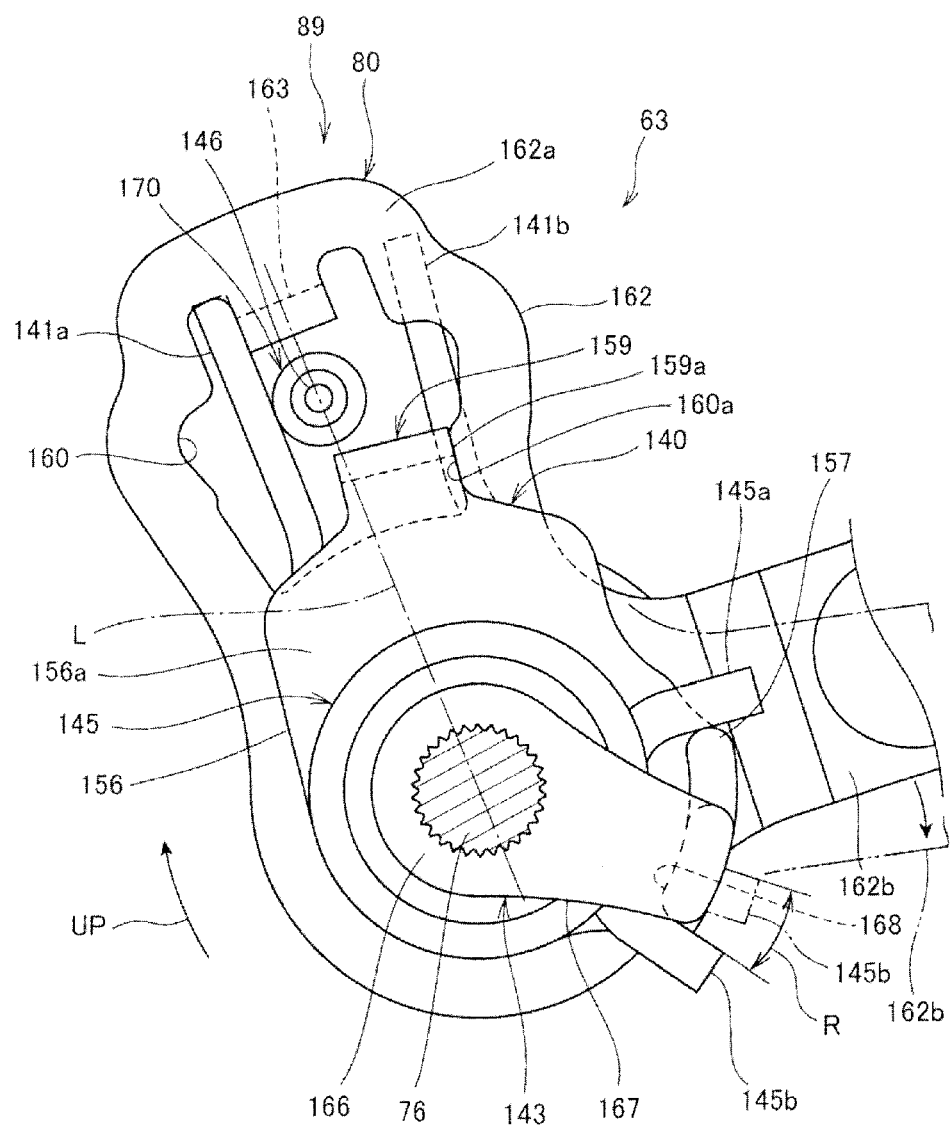
FIG. 17 illustrates a state advanced in the shift-up direction from a force accumulation preparatory state.

FIG. 17 illustrates a state advanced in the shift-up direction from the force accumulation preparatory state.

In the state depicted in FIG. 17, attendant on rotation of the shift spindle 76, only the force accumulation arm side end portion 145b of the force accumulation spring 145 has been rotated by a predetermined amount R by the force accumulation arm 168, with the gear shift arm side end portion 145a of the force accumulation spring 145 left positionally fixed by the first locking piece 157. In the following description, the state of FIG. 17 will be referred to as a force accumulated state.

In the force accumulated state, the bending amount of the force accumulation spring 145 has been increased by an amount corresponding to the predetermined amount R, so that a predetermined amount of force accumulation in the force accumulation spring 145 has been completed. In addition, in the force accumulated state, the rotational amount of the master arm 80 from the neutral state is zero.

Figure 15C:
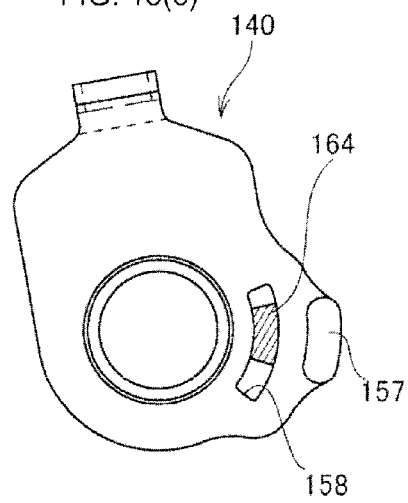

In the force accumulated state, in contrast to the gear shift arm 140 which would not be rotated because of restraint by the restriction opening 160, the shift-down collar 142 has been rotated together with the shift spindle 76. In the force accumulated state, therefore, as shown in FIG. 15(c), the dog tooth 164 is located at an intermediate position between the one end and the other end of the hole 158 in the gear shift arm 140.

The sub return spring locking collar 148 has been rotated against the biasing force of the sub return spring 150. In this state, the other end 150b of the sub return spring 150 is opened by a further predetermined amount from the state in the force accumulation preparatory state, as indicated by alternate long and two short dashes line in FIG. 13.

Referring to FIG. 3, the clutch lever 82 is rotated as one body with the shift spindle 76. Attendant on the rotation of the clutch lever 82, the lifter cam plate 85 is moved in the axial direction, whereby the change clutch 61 is disengaged. With the change clutch disengaged, restraint on the master arm 80 by the transmission 60 is canceled, so that the master arm 80 becomes rotatable. The moment the change clutch 61 is disengaged, the force accumulated in the force accumulation mechanism 81 is released, so that the master arm 80 is rotated to a position indicated by alternate long and two short dashes line in FIG. 17 at a stroke by the accumulated force through the gear shift arm 140. Therefore, a shift can be performed speedily. The master arm 80 is rotated until that portion of the restriction opening 160 which is on the one end 141a side comes into contact with the damper portion 170 of the stopper pin 146.

Figure 15D:
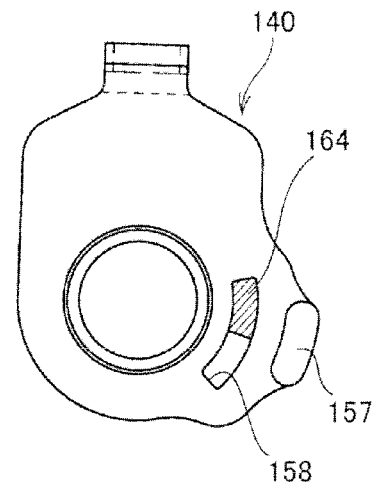

When the accumulated force is released, the gear shift arm 140 is rotated in a shift-up direction relative to the shift-down collar 142 staying at rest, resulting in that one end of the hole 158 in the gear shift arm 140 makes contact with the dog tooth 164 as shown in FIG. 15(d). Therefore, when rotating the shift spindle 76 in the shift-down direction opposite to the shift-up direction, the gear shift arm 140 can be rapidly rotated in the shift-down direction through the dog tooth 164. Consequently, returning into the neutral state can be achieved speedily.

When completion of the shift is detected on the basis of the result of detection by the spindle angle sensor 79, the control unit 17 rotates the shift spindle 76 reversely, whereby the master arm 80 is returned into the neutral state, and the change clutch 61 is engaged.

Figure 18:
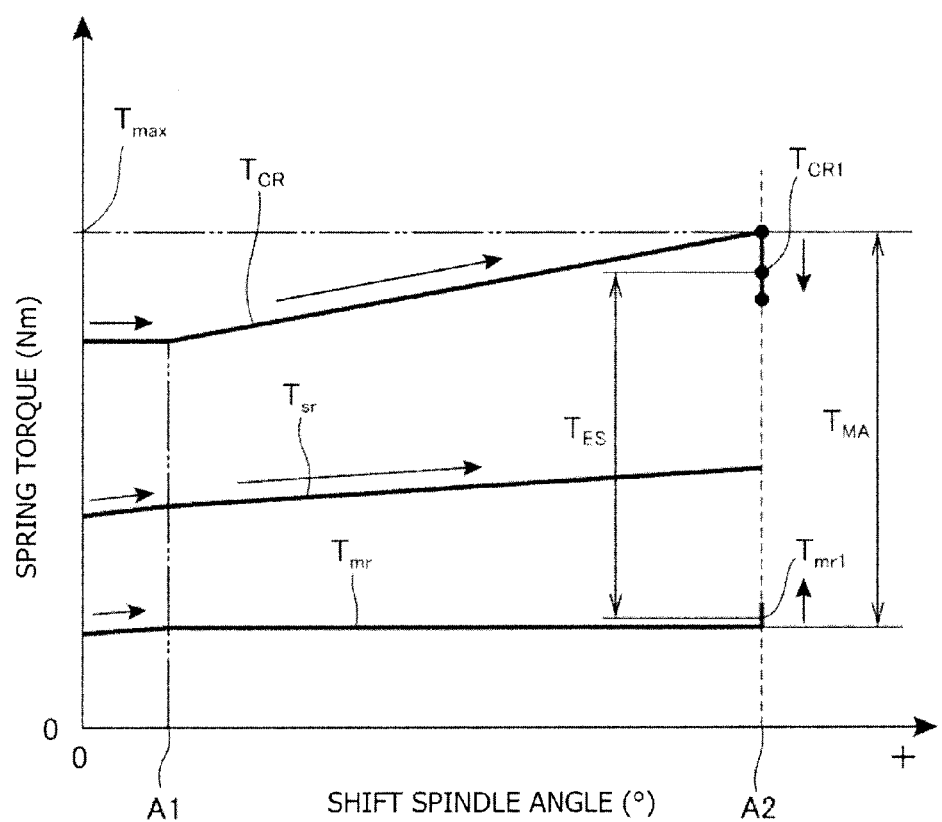
FIG. 18 is a diagram showing spring torque in relation to rotational angle of the shift spindle.

FIG. 18 is a diagram showing spring torque in relation to rotational angle of the shift spindle 76.

FIG. 18 shows a torque $T_{mr}$ of the return spring 141, a torque $T_{sr}$ of the sub return spring 150, and a torque $T_{CR}$ of the force accumulation spring 145, in relation to the rotational angle of the shift spindle 76 at the time of shifting-up.

In FIG. 18, at a rotational position A1 of the shift spindle 76, the force accumulation preparatory state of FIG. 16 is finished; the section between the rotational position A1 and a rotational position A2 is in a force accumulated state; and at the rotational position A2, the force accumulated state of FIG. 17 is finished, the clutch is disengaged and the accumulated force is released.

As shown in FIG. 18, in a neutral state (0°), initial loads are imparted to the return spring 141, the sub return spring 150 and the force accumulation spring 145. In the section from the neutral state to the rotational position A1, the torque $T_{mr}$ and the torque $T_{sr}$ increase in proportion to an increase in the rotational angle, whereas the torque $T_{CR}$ does not vary.

In the section of the force accumulation preparatory state, the torque $T_{mr}$ does not vary even if the rotational angle increases, whereas the torque $T_{sr}$ and the torque $T_{CR}$ increase in proportion to an increase in the rotational angle.

When the accumulated force is released at the rotational position A2, the torque $T_{CR}$ is reduced, whereas the torque $T_{mr}$ increases because the variation amount of the return spring 141 is increased by the release of the accumulated force.

In other words, the decrease in the torque $T_{CR}$ at the rotational position A2 occurs stepwise. First, the torque $T_{CR}$ is reduced by one stage (step) until the dog tooth of a gear in the transmission 60 comes into contact (dog abutment) with a side surface of the adjacent gear, and, further, the torque $T_{CR}$ is reduced by one stage (step) until the dog tooth comes into complete engagement. Here, the torque of the force accumulation spring 145 at the time of dog abutment is represented as $T_{CR1}$ in FIG. 18. Note that in the case where dog abutment is not generated, the torque $T_{CR}$ falls at a stroke down to a complete engagement position of the dog tooth.

In addition, the increase of the torque $T_{mr}$ at the rotational position A2 occurs stepwise. First, the torque $T_{mr}$ increases by one stage (step) until the dog tooth of the gear in the transmission 60 comes into contact (dog abutment) with the side surface of the adjacent gear, and, further, the torque $T_{mr}$ increases by one stage (step) until the dog tooth comes into complete engagement. Here, the torque of the return spring 141 at the time of dog abutment is represented as $T_{mr1}$ in FIG. 18.

At the time when the accumulated force is released, the gear shift arm 140 is rotated against the return spring 141. Therefore, a torque $T_{MA}$ exerted on the master arm 80 upon the release of the accumulated force at the rotational position A2 is a torque $T_{CR}-T_{mr}$.

Specifically, the torque $T_{MA}$ is set to be greater than a torque $T_{ES}$ of the master arm 80 at the time when dog abutment in the transmission 60 is generated after the release of the accumulated force. The torque $T_{ES}$ is set at a value obtained by calculation, experiments or the like.

Figure 19:
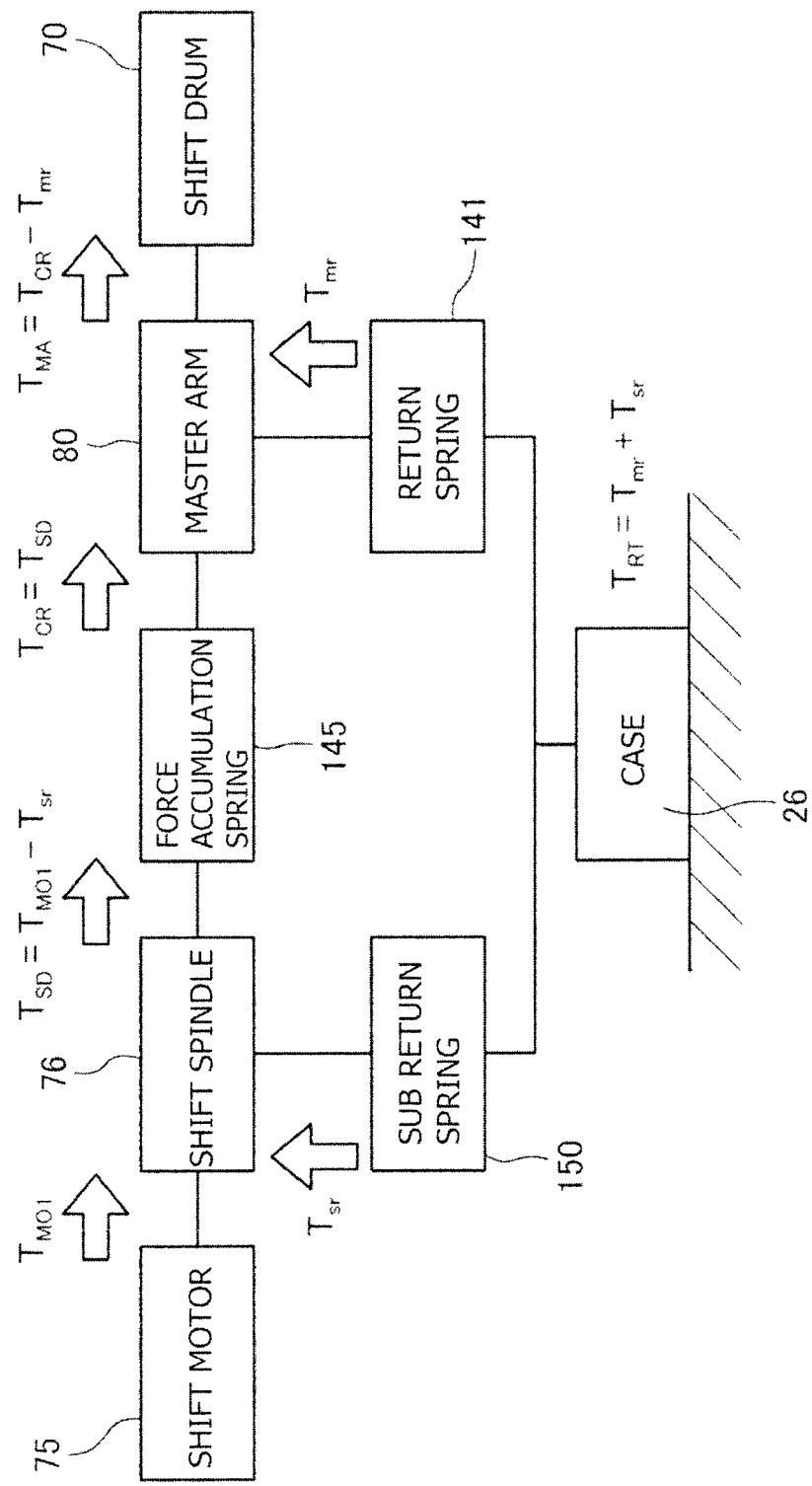
FIG. 19 is a diagram showing a transmission path of torque from a shift motor at the time of a shift-up.

FIG. 19 is a diagram showing a transmission path of torque from the shift motor 75 at the time of shifting-up.

As shown in FIG. 19, a torque $T_{MO1}$ of the shift motor 75 is reduced by the sub return spring 150. Therefore, a torque $T_{SD}$ of the shift spindle 76 is a torque $T_{MO1}-T_{sr}$. The torque $T_{CR}$ outputted from the force accumulation spring 145 is a torque $T_{CR}=T_{SD}$.

The torque $T_{CR}$ of the force accumulation spring 145 is outputted against the return spring 141. Therefore, the torque $T_{MA}$ of the master arm 80 is a torque $T=T_{CR}\ T_{mr}$.

During force accumulation, the shift spindle 76 is rotated against the return spring 141 and the sub return spring 150. Therefore, a torque $T_{RT}$ (return torque) exerted in the direction for returning the shift spindle 76 into the neutral state is a torque $T_{RT}=T_{mr}+T_{sr}$.

In certain embodiments, the sub return spring 150 is provided on the shift spindle 76 as a separate body from the return spring 141 of the force accumulation mechanism 81. Therefore, the return torque for returning the shift spindle 76 into the neutral state can be enlarged, without influencing the amount of force accumulated in the force accumulation mechanism 81. With a great return torque thus secured, it is ensured that, for example, even in the case where the main power source of the motorcycle 10 is turned off during a shifting operation conducted by the automatic speed change apparatus 25, the shift spindle 76 can be forcibly returned into the neutral state by a biasing force of the return spring 141 and the like. In this case, the return torque is set to be greater than a cogging torque of the shift motor 75.

Figure 20:
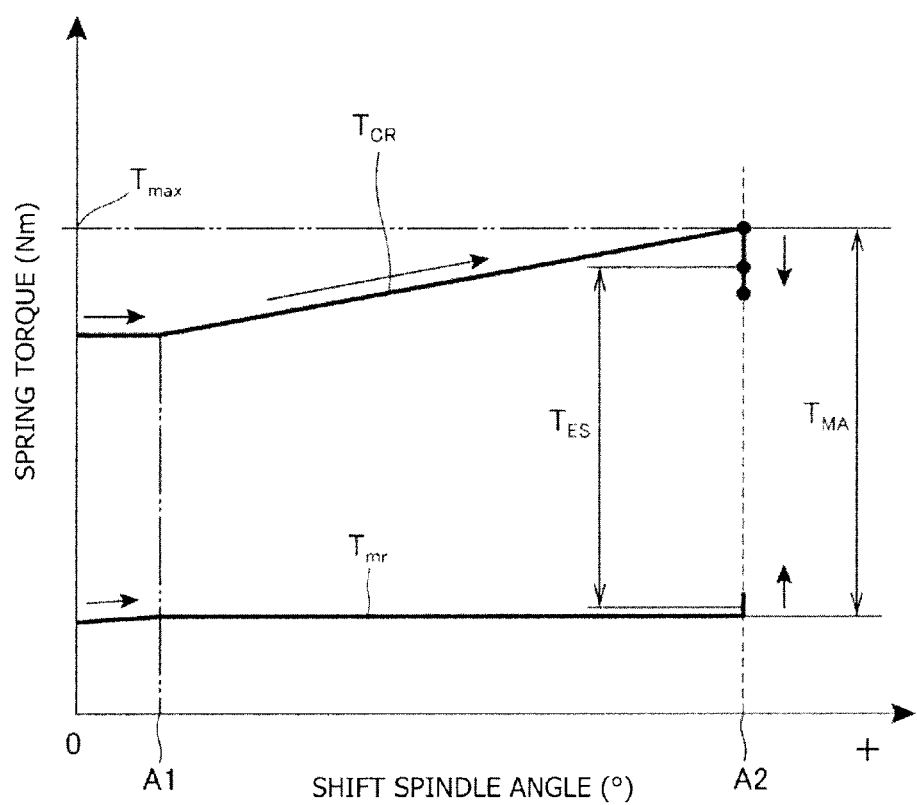
FIG. 20 is a diagram showing spring torque in relation to rotational angle of a shift spindle in a related art example in which a sub return spring is not provided.
Figure 21:
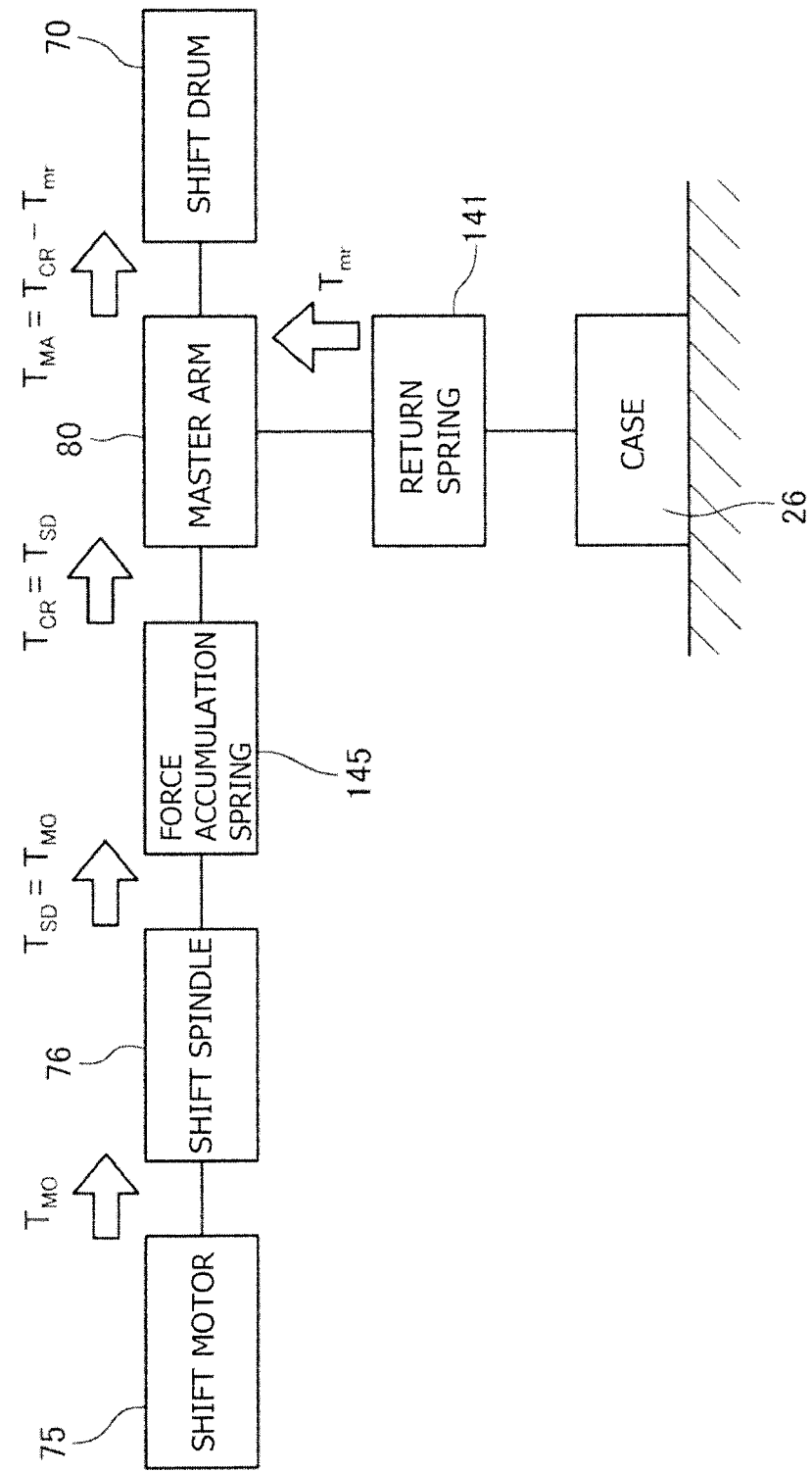
FIG. 21 is a diagram showing a transmission path of torque from a shift motor at the time of a shift-up in the related art example.

FIG. 20 is a diagram showing spring torque in relation to rotational angle of the shift spindle 76, in a related art example in which the sub return spring 150 is not provided. FIG. 21 is a diagram showing a transmission path of torque from the shift motor 75 at the time of shifting-up in the related art example.

Referring to FIGS. 18 and 20, while the return torque is increased by providing the sub return spring 150 in the present embodiment, the torque $T_{mr}$ of the return spring 141 is the same as that in the related art example of FIG. 20. Therefore, it is unnecessary to enlarge the torque $T_{CR}$ of the force accumulation spring 145 for the purpose of securing the same torques $T_{ES}$ and $T_{MA}$ as those in the related art example. The maximum torque $T_{max}$ of accumulated force in the present embodiment is the same as the maximum torque $T_{max}$ of accumulated force in the related art example.

As shown in FIG. 21, in the related art example, the sub return spring 150 is not provided, and, therefore, the torque $T_{SD}$ of the shift spindle 76 is equal to a torque $T_{MO}$ of the shift motor 75.

On the other hand, the torque $T_{MO1}$ of the shift motor 75 in the present embodiment is greater than the torque $T_{MO}$ in the related art example by an amount corresponding to the torque $T_{sr}$ of the sub return spring 150.

Figure 22:
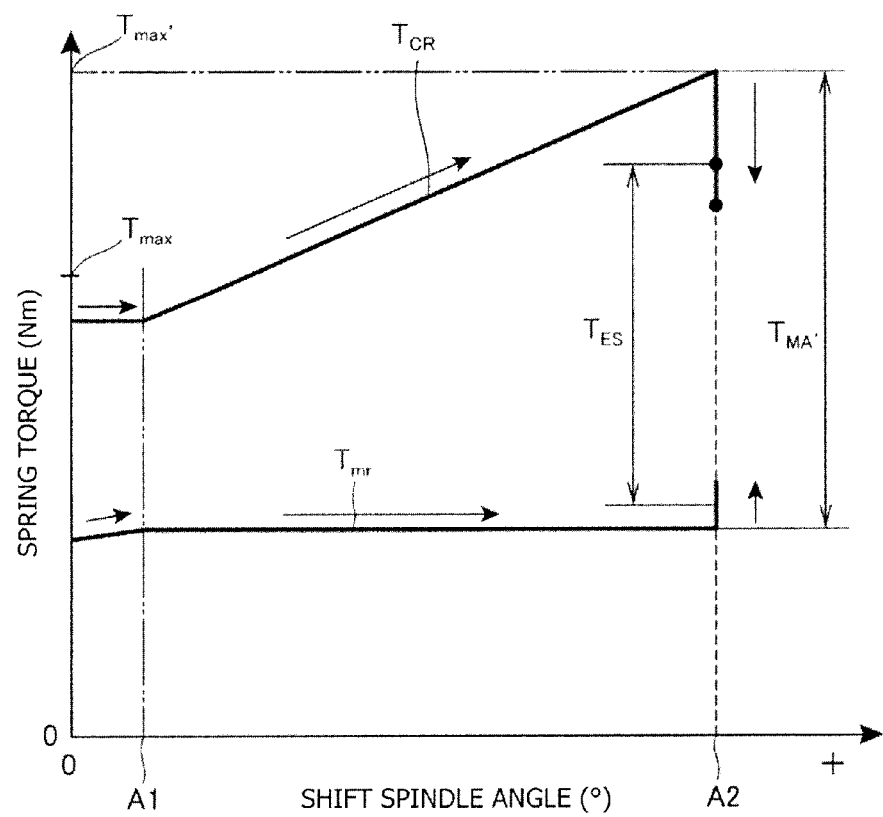
FIG. 22 is a diagram showing spring torque in relation to rotational angle of a shift spindle in a comparative example.

FIG. 22 is a diagram showing spring torque in relation to rotational angle of the shift spindle 76 in a comparative example.

In the comparative example of FIG. 22, in order to secure a return torque of the shift spindle 76, the torque $T_{mr}$ of the return spring 141 is set to be greater than that in the related art example of FIG. 20.

In this comparative example, the torque $T_{mr}$ is set to be high. Therefore, when the same torque $T_{ES}$ as that in the related art example is secured, it is necessary to enlarge the torque $T_{CR}$ of the force accumulation spring; thus, the maximum torque $T_{max}'$ of accumulated force is greater than the maximum torque $T_{max}$ in the present embodiment. Note that the torque $T_{MA}'$ in the comparative example corresponding to the torque $T_{MA}$ in the related art example is increased as compared with that in the related art example, as the torque $T_{mr}$ is set large.

When the maximum torque $T_{max}'$ of the accumulated force is enlarged as in the comparative example, the momentum of the master arm 80 upon the release of the accumulated force is increased, so that the impact sound generated when the master arm 80 comes into contact with the stopper pin 146 is also enlarged. Besides, in the comparative example, a large-type shift motor capable of producing a higher torque is needed.

On the other hand, in the present embodiment, the return torque can be enlarged alone, without enhancing the maximum torque $T_{max}$ of accumulated force from that in the related art example. Therefore, the shift spindle 76 can be effectively returned into the neutral state, and the impact sound generated when the master arm 80 is rotated can be reduced.

As has been described above, according to certain embodiments of the present invention, the speed change apparatus for a vehicle includes the transmission 60 including the main shaft 65 driven by the crankshaft 23 of the engine 21 and provided with the plurality of driving gears 67a, 67b, 67c and 67d, and the counter shaft 66 provided with the plurality of driven gears 68a, 68b, 68c and 68d which are driven by the driving gears 67a, 67b, 67c and 67d. The change mechanism 89 is configured to move the driving gear 67b and the driven gear 68c of the pluralities of the driving gears 67a, 67b, 67c and 67d and driven gears 68a, 68b, 68c and 68d so as to change gear position. The force accumulation mechanism 81 including the shift spindle 76 provided with the master arm 80 is configured to operate the change mechanism 89, the shift spindle 76 and the master arm 80 being rotatable relative to each other, the force accumulation collar 143 provided on the shift spindle 76 and rotated as one body with the shift spindle 76, the gear shift arm 140 rotatable relative to the shift spindle 76, and the force accumulation spring 145 arranged between the force accumulation collar 143 and the gear shift arm 140. The return spring 141 is provided between the master arm 80 and the stopper pin 146 on the crankcase 26 side of the transmission 60. The return spring 141 is configured to bias the master arm 80 toward a neutral position. The sub return spring 150 configured to directly bias the shift spindle 76 toward the neutral position is provided between the shift spindle 76 and the crankcase 26, the sub return spring 150 being a separate body from the return spring 141. In this configuration, the sub return spring 150 provided between the shift spindle 76 and the crankcase 26 as a separate body from the return spring 141 does not influence the torque $T_{MA}$ exerted on the change mechanism 89 from the master arm 80 by the force accumulated in the force accumulation spring 145 attendant on the rotation of the shift spindle 76, and the torque $T_{MA}$ is a torque obtained by subtracting the torque $T_{mr}$ of the return spring 141 from the torque $T_{CR}$ of the force accumulation spring 145. Therefore, it is unnecessary to enhance the torque characteristics of the force accumulation spring 145 for the purpose of securing the predetermined torque value $T_{ES}$. In addition, the return torque $T_{RT}$ exerted on the shift spindle 76 is the sum of the torque $T_{mr}$ of the return spring 141 and the torque $T_{sr}$ of the sub return spring 150. Thus, a large return torque $T_{RT}$ can be secured. Accordingly, it is possible to enhance the return torque $T_{RT}$ of the shift spindle 76, without enhancing the torque characteristics of the force accumulation spring 145, and to reduce the collision sound (impact sound) generated when the master arm 80 is rotated.

In addition, the sub return spring 150 is arranged between the boss 173 which is integrally formed from the wall portion 37 of the crankcase 26 and the sub return spring locking collar 148 which is provided on the shift spindle 76 and rotated as one body with the shift spindle 76. Therefore, the sub return spring 150 for applying the return torque $T_{RT}$ to the shift spindle 76 can be provided in a simple configuration.

In certain embodiments, the crankcase 26 is provided by mating the one-side case half 26L and the other-side case half 26R to each other in the transverse direction. The transmission chamber 32 in which to accommodate the driving gears 67a, 67b, 67c and 67d and the driven gears 68a, 68b, 68c and 68d of the transmission 60 is defined by the wall portion 37 of the one-side case half 26L and the wall portion 36 near the faying surface 26F of the other-side case half 26R. The sub return spring 150 is disposed inside the transmission chamber 32, whereas the sub return spring locking collar 148 is disposed outside of the transmission chamber 32. The wall portion 36 is provided with the hole 177 arc-shaped as viewed in the axial direction, and the arm portion 176 of the sub return spring locking collar 148 is provided to extend through the hole 177. According to this configuration, the sub return spring 150 can be locked by the arm portion 176 of the sub return spring locking collar 148 extending to be passed through the hole 177 in the wall portion 36 from outside of the transmission chamber 32. Thus, the sub return spring 150 can be provided in a dead space of the transmission chamber 32. Accordingly, the transmission 60 can be reduced in size.

Note that the above embodiment is merely an exemplary embodiment of the present invention, and the present invention is not to be limited to the above embodiment.

While the gear position has been described to be changed by moving the driving gear 67b and the driven gear 68c in the above embodiment, the present invention is not limited to this. A configuration may be adopted in which the gear position is changed by moving at least one gear.

In addition, while the above embodiment describes the motorcycle 10 as an example of the vehicle, the present invention is not limited to this but may be applied to such vehicles as three-wheeled vehicles and four-wheeled vehicles.

DESCRIPTION OF REFERENCE SIGNS

10: Motorcycle (Vehicle)
21: Engine
23: Crankshaft
25: Automatic speed change apparatus (Speed change apparatus)
26: Crankcase (Case member)
26F: Faying surface (Faying portion)
26L: One-side case half
26R: Other-side case half
32: Transmission chamber
36b: Inner wall
37: Wall portion (Wall portion of case member; Outer wall)
60: Transmission
65: Main shaft
66: Counter shaft
67b: Driving gear (Gear)
68c: Driven gear (Gear)
67a, 67b, 67c, 67d: Driving gears (Row of driving gears)
68a, 68b, 68c, 68d: Driven gears (Row of driven gears)
76: Shift spindle
80: Master arm
81: Force accumulation mechanism
89: Change mechanism
140: Gear shift arm
141: Return spring
143: Force accumulation collar
145: Force accumulation spring
146: Stopper pin (Stopper portion)
148: Sub return spring locking collar
150: Sub return spring
173: Boss
176: Arm portion
177: Hole

The invention claimed is:

1. A speed change apparatus for a vehicle, said apparatus comprising:

a transmission including
- a main shaft driven by a crankshaft of an engine and provided with a plurality of driving gears in a row, and
- a counter shaft provided with a plurality of driven gears in a row which are driven by the driving gears;

a change mechanism configured to move at least one gear of the pluralities of driving gears and driven gears so as to change gear position;

a force accumulation mechanism including
- a shift spindle provided with a master arm configured to operate the change mechanism, the shift spindle and the master arm being rotatable relative to each other,
- a force accumulation collar provided on the shift spindle and configured to be rotated as one body with the shift spindle,
- a gear shift arm rotatable relative to the shift spindle, and
- a force accumulation spring disposed between the force accumulation collar and the gear shift arm; and a return spring provided between the master arm and a stopper portion on a case member side of the transmission, the return spring configured to bias the master arm toward a neutral position, wherein a sub return spring configured to directly bias the shift spindle toward the neutral position is provided between the shift spindle and a case member, the sub return spring being a separate body from the return spring.

2. The speed change apparatus for a vehicle according to claim 1, wherein the sub return spring is disposed between a boss which is integrally formed from a wall portion of the case member and a sub return spring locking collar which is provided on the shift spindle and rotated as one body with the shift spindle.

3. The speed change apparatus for a vehicle according to claim 2, wherein the case member comprises:
- a one-side case half and an other-side case half mated to each other in a transverse direction;
- a transmission chamber configured to accommodate the driving gears and the driven gears of the transmission is defined by an outer wall of the one-side case half and an inner wall near a faying portion of the other-side case half,
- wherein the sub return spring is disposed inside the transmission chamber, the sub return spring locking collar is disposed outside of the transmission chamber, the inner wall is provided with a hole arc-shaped as viewed in an axial direction, and an arm portion of the sub return spring locking collar is provided to extend through the hole.

4. A speed change apparatus for a vehicle, said apparatus comprising:
- transmission means for transmitting rotating power from an engine, said transmission means including
  - main shaft means driven by a crankshaft of the engine, said main shaft means including a plurality of driving gear means for transmitting power from the crankshaft,
  - counter shaft means including a plurality of driven gear means for receiving power from the driving gear means;
- change means for moving at least one gear of the plurality of driving gear means and a driven gear of the driven gear means so as to change a gear position;
- force accumulation means for accumulating force, said force accumulation means including
  - shift spindle means including master arm means for operating the change means, the shift spindle means and the master arm means being rotatable relative to each other,
  - force accumulation collar means disposed on the shift spindle means for being rotated as one body with the shift spindle means,
  - gear shift arm means rotatable relative to the shift spindle means, and
  - force accumulation spring means disposed between the force accumulation collar means and the gear shift arm means; and
- return spring means disposed between the master arm means and a stopper means on a case member side of the transmission means, the return spring means for biasing the master arm means toward a neutral position;
- sub return spring means for directly biasing the shift spindle means toward the neutral position, said sub return spring means being disposed between the shift spindle means and a case member, the sub return spring means being separate from the return spring means.

5. The speed change apparatus for a vehicle according to claim 4, wherein the sub return spring means is disposed between a boss which is integrally formed from a wall portion of the case member and a sub return spring collar means which his disposed on the shift spindle means and is rotated as one body with the shift spindle means.

6. The speed change apparatus for a vehicle according to claim 5, wherein the case member comprises:
- a one-side case half and an other-side case half mated to each other in a transverse direction,
- wherein a transmission chamber means for accommodating the driving gear means and the driven gear means of the transmission means is defined by an outer wall of the one-side case half and an inner wall near a faying portion of the other side case half, and wherein the sub return spring means is disposed inside the transmission chamber, the sub return spring locking collar means is disposed outside of the transmission chamber, the inner wall is provided with a hole arc-shaped as viewed in an axial direction, and wherein an arm portion of the sub-return spring locking collar means is provided to extend through the hole.

* * * * *